United States Patent [19]

Freeman

[11] Patent Number: 5,186,746
[45] Date of Patent: Feb. 16, 1993

[54] HIGH PERFORMANCE SAMS PIGMENTS OF LOW OIL, ABSORPTION, PREPARATION, PROPERTIES AND END-USE APPLICATIONS

[75] Inventor: Gary M. Freeman, Macon, Ga.

[73] Assignee: J. M. Huber Corporation, Rumson, N.J.

[21] Appl. No.: 819,637

[22] Filed: Jan. 10, 1992

Related U.S. Application Data

[63] Continuation of Ser. No. 567,563, Aug. 15, 1990, abandoned.

[51] Int. Cl.$^5$ .......................... C01B 33/26; C09C 1/02; C09C 1/28
[52] U.S. Cl. ...................... 106/416; 106/467; 106/468; 106/486; 106/487; 423/118; 423/718; 423/200; 428/452; 428/453; 428/471; 501/144; 501/145

[58] Field of Search ............... 106/416, 467, 468, 486, 106/487; 423/118, 328, 329; 428/452, 453, 471; 501/144, 145

[56] References Cited

U.S. PATENT DOCUMENTS

| | | | |
|---|---|---|---|
| 3,690,907 | 9/1972 | Kroening et al. | 106/467 |
| 4,416,805 | 11/1983 | Kostinko | 106/467 |
| 4,863,796 | 9/1989 | Wason | 106/467 |

Primary Examiner—William R. Dixon, Jr.
Assistant Examiner—Scott L. Hertzog
Attorney, Agent, or Firm—Harold H. Flanders; Alec H. Horn; Robert L. Price

[57] ABSTRACT

Sodium Aluminosilicates (SAMS) are produced by silicate/clay reactions under hydrothermal conditions, the SAMS being characterized by low oil absorption values and high total pore volumes. The SAMS products are useful as coating pigments for paper, paper fillers and paint pigments.

6 Claims, 13 Drawing Sheets

HIGH PERFORMANCE SAMS PIGMENTS OF LOW OIL, ABSORPTION, PREPARATION, PROPERTIES AND END-USE APPLICATIONS

This application is a continuation of application Ser. No. 07/567,563 filed Aug. 15, 1990 now abandoned.

RELATED AND PRIOR ART

The SAMS pigments described herein are synthetic sodium aluminosilicate compositions prepared from the hydrothermal reaction of select kaolin clays with sodium silicates. The products of this invention are "unique" in that they represent an anomaly to the prior art SAMS knowledge by offering high performance properties despite their low oil absorption characteristics. Literature relevant to discussing this new pigment technology is cited below:

(1) S. K. Wason, U.S. Pat. No. 4,812,299 (1989) and references cited therein.
(2) S. K. Wason, U.S. Pat. No. 4,863,796 (1989) and references cited therein.
(3) S. K. Wason, J. Soc. Cosmet. Chem., 29:497-521 (Aug., 1978).
(4) P. Lepoutre, N. Pauler, B. Alince and M. Rigdahl, J. Of Pulp and Paper Science: Vol. 15, No. 5, 183 (1989).
(5) J. S. Whatley, Huber Report CL-100, No. 1, "SAMS Sparger Car Studies" (Sep. 10, 1987).
(6) R. E. Hardy and G. M. Freeman: TAPPI Coating Conference Proceedings, 147-153 (May, 1989).

DESCRIPTION OF THE INVENTIVE CONCEPT

A method for preparing high performance SAMS pigments with low oil absorption properties is disclosed. These SAMS products are still produced by sodium silicate/clay reactions conducted under hydrothermal conditions as generally disclosed in Reference 1. However, they represent a significant refinement in the art and can be thought of as a more preferred embodiment of the earlier Wason patents. In particular, the SAMS products of this invention represent an anomaly to the prior art knowledge in that they offer superior performance properties versus Samtone TM 581, Samhide TM 583 or Samflex 585; yet they have low oil absorption values. In the prior art, SAMS performance properties were equated directly to structure as defined by an arbitrary set of oil absorption criteria. In this invention, a new definition of SAMS pigment structure derived from porosimetry based principles is proposed that offers a more universal understanding of pigment structure/property relationships. Applying these new structure principles, a select and unobvious combination of reaction parameters were identified and then utilized to yield SAMS type pigments having some unique structural properties as follows:

1. A pore structure which has very high total pore volume (exceeding 2.5 ml/gm in the most preferred embodiment of the invention).
2. A relatively narrow pore size distribution that is centered near a pore diameter of 0.3 micron (which is the optimal porosity design for efficient scattering of visible light).
3. An oil absorption value that is less than 115 ml/100 g despite their high pore volume content (this insures improved wet-out and slurry rheology properties versus the Samtone 581 product).
4. A product particle size that falls within the range of 78-90% -2 microns (a 0.5-0.7 micron average particle diameter) as determined by x-ray sedigraph.

It should be noted that many structured SAMS pigments of the prior art have pore volumes greater than 2.5 ml/gm; but clearly failed to simultaneously meet the last three criteria summarized above. To produce SAMS pigments having the unique total combination of structural properties set forth in this invention, several advancements in the hydrothermal reaction process had to be realized. In particular, the important role that reactor mixing intensity plays in determining pore structure and particle size properties had to be discovered and then utilized to help fine tune final SAMS properties. Secondly, upon scale-up to production, the steam addition rate used in bringing the reactor up to its operating temperature and pressure was found to be critical. Needed adjustments in product particle size were eventually realized by properly controlling the steam flow profile. This was accomplished by using an automated steam flow control valve system. Additionally, reactor solids have to be precisely chosen for each Base/Clay combination to yield the required pore size distribution properties. Changes in reaction solids of even 2%, very often had profound influences on pigment structure. The importance of these reaction parameters was not recognized in the prior art process.

BRIEF DESCRIPTION OF THE DRAWINGS

Reference is now made to the drawings accompanying the application wherein.

PREFERRED EMBODIMENTS

Figure 1:
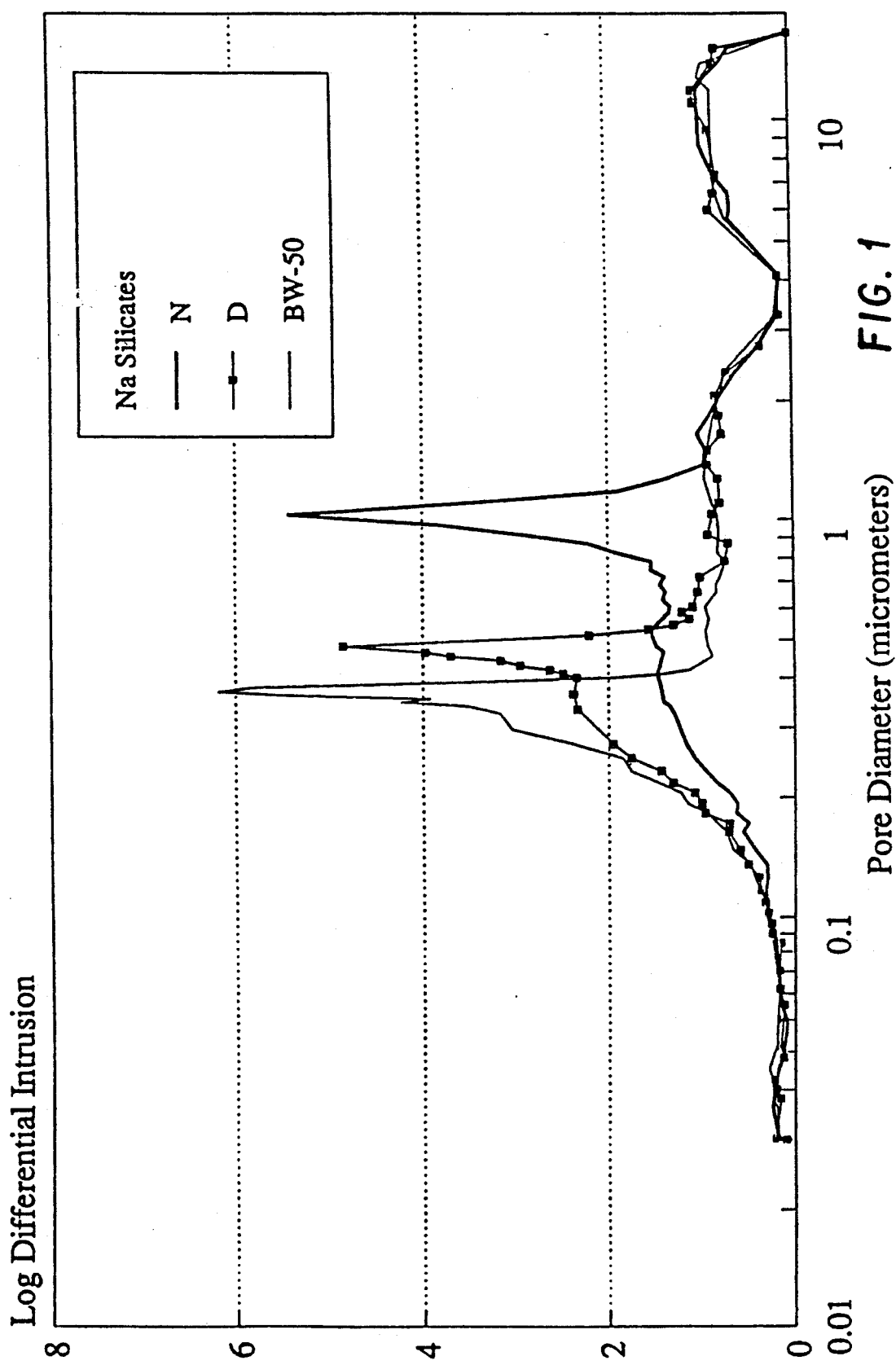
FIGS. 1, 2, 6 and 9 are pore size distribution curves which are plots of log differential intrusion versus pore diameter.

The SAMS products of the invention are useful as coating pigments for paper, paper fillers, and as paint pigments.

The present invention is further illustrated by the following examples, which should be regarded as demonstrating only some of the preferred embodiments and not limiting thereof.

EXAMPLE 1

In this example, a systematic study of SAMS products prepared from sodium silicate/Hydragloss TM 90 reactions conducted under hydrothermal conditions was undertaken. The purpose of this study was to demonstrate the unique relationship between silicate type and Base/Clay ratio as required to yield SAMS products of this invention. The complete matrix of reactions we investigated is summarized in Table 1-A. As shown there, sodium silicate reagents ranging in $SiO_2/Na_2O$ mole ratio composition from 3.33 to 1.0 were studied at various B/C molar ratios. A table detailing the composition and properties of the various sodium silicate reagents available from PQ Corporation is enclosed as Table 1-D.

In all cases, the SAMS reactions of Table 1-A were conducted at 12% solids in a 2-gallon laboratory Parr Reactor using 120 psig (172° C.) conditions over a one-hour cook period and a constant mixing speed of 250 rpm. The total reaction batch weight always equalled 5600 gm. On that basis, for example, the reaction of N-silicate with Hydragloss TM 90 clay at a 0.1 B/C molar ratio required the following batch recipe:

| | |
|---|---|
| Step 1 | 610.05 gm of active Hydragloss 90 spray-dried clay was made down in water at 50% solids using a Waring blender. |
| Step 2 | A sodium silicate solution was prepared by combining 164.8 gm of N-silicate reagent (as received) and 4215.1 gm of water. |
| Step 3 | The hydragloss 90 clay slurry and sodium silicate solution were combined, mixed well and then charged to the Parr reactor for subsequent heating at 175° C. |

The remaining reactions outlined in Table 1-A were put together in a fully analogous fashion. Upon completing the one hour cook period at 120 psig (172° C.), each product slurry was cooled to about 65° C. and filtered on a Buchner funnel. The filter cake material was washed with three volumes of water and subsequently re-dispersed under low shear at approximately 20% solids for spray-drying in a Nichols Model 53 dryer. The spray-dried products were then subjected to a full battery of physical property tests, such as percent brightness, sedigraph particle size, oil absorption and pore volume analysis by mercury intrusion. The mercury porosimetry data, in particular total pore volume and pore size distribution, are important in accessing the potential optical functionality of structured SAMS pigments.

In the prior art (References 1 and 2), the structural characteristics of silica and silicate pigments have been loosely defined in terms of a set of oil absorption criteria. This method attempts to classify the gross structure level of a pigment on the basis of that pigment's oil absorption capacity (see Table 1-B for classifications). An inherent implication of this structure concept has been that pigments of high structure (i.e., high oil absorption) are thought to offer more performance functionality than pigments of low oil absorption (Reference 1). Using that basic guideline, the SAMS reaction products representing the preferred embodiment of the prior art (like Samtone 581) were engineered with respect to maximizing their oil absorption capacity.

It is now apparent that SAMS pigment structure cannot be properly defined by oil absorption values. The method falsely assumes that all pigment porosity is accessible to oil penetration through capillary type action. Oil absorption measurements of pigment structure provide a relative assessment of pore volume, but wherein only certain pores of sufficient diameter to accommodate oil are actually accounted for. Data presented later in Example 5 indicate that oil absorption measurements neglect large portions of pigments porosity that are very important to light scattering efficiency. Another inherent weakness of the oil absorption methodology is that no information is obtained concerning average pore size or pore size distribution.

A more universal understanding of property/structure relationships in SAMS products has been gained by collecting total pore volume and pore size distribution information by mercury intrusion and comparing structural characteristics on that basis (Reference 6). The gross structure level of a SAMS pigment is defined here on the basis of its total pore volume (see Table 1-B for the various structure classifications). From optical considerations discussed elsewhere (Reference 3 and 4), it follows that the total pore volume and particularly the pore size distribution of a given microvoid structure should be related to overall pigment performance. Optical theory indicates that for a porous medium of 1.5 refractive index that microvoids of 0.2–0.7 micron diameter are needed for efficient scattering of visible light. Optimal scattering efficiency is provided by microvoids of uniform 0.3 micron diameter. Working under these theoretical premises, a class of unique SAMS compositions exhibiting enhanced performance properties can be engineered by the proper selection of various reaction parameters. Important SAMS reaction parameters include the following:

Hydrous clay feedstock (starting particle size)
Molar ratio composition of sodium silicate
Base/Clay molar ratio
Reaction time
Reaction temperature/pressure
Reaction solids
Reactor mixing intensity
Steam addition profile In particular, the specific influence of mixing intensity, percent reaction solids and steam addition profile on SAMS structure and particle size properties was not recognized in the prior art process. These process related points will be illustrated in more detail in later examples. In short, the present invention provides SAMS compositions and improved methods for their preparation which are unique and whose performance properties would be unexpected in view of the prior art knowledge.

From the large matrix of reactions examined per Table 1-A), those which produced SAMS products that illustrate the general embodiment of this invention are listed in Table 1-C. The respective physical properties of these products are summarized in Table 1-C as well. They physical property criteria used to describe SAMS compositions of this invention are as follows:

1. The SAMS products will have an oil absorption capacity less than 115 ml/100 g, while simultaneously possessing a total pore volume of at least 2.0 ml/gm. It is extremely important that the SAMS products have an oil absorption capacity less than 115 ml/100 g for assuring acceptable wet-out and rheological behavior when producing aqueous product slurries. A main objective of this SAMS invention was to develop a functional equivalent to Samtone 581 that had the capability of being shipped to customers in bulk as a high solids slurry. SAMS of the prior art (like Samtone 581) exhibited poor rheological properties as a consequence of their high oil absorption. Samtone 581 could therefore not be slurried at 50% solids unless the functionality of the slurry product was significantly reduced by large additions of fine particle size hydrous clay which serves solely as a rheological additive (see Example 6). The ability to produce a SAMS product slurry of at least 50% solids was of commercial importance since large volume customers (particularly paper mills) were in most cases unwilling to buy Samtone 581 as a dry product in kraft bags or super sacks. Extensive labor costs arise when dry bag product must be made down on site at the customer's facility. It should also be noted that slurry solids of 50% or greater are needed, otherwise freight rates become cost prohibitive. Likewise, Samtone 581 (unlike calcined clay) could not be supplied to customers in bulk sparger cars because of its poor wet-out properties (Reference 5, copy of report attached). Given the described shortcomings of Samtone 581, it became necessary to develop a second generation low oil absorption SAMS product offering bulk slurry capabilities yet maintaining high pigment performance attributes in the end use applications. To offer good optical performance, SAMS structured pigments must still contain a total pore volume of at least 2.0 ml/gm. The high pore volume of such products enhances the optical efficiency of various paper and costing systems by increasing the number of microvoids present to scatter visible light. It should also be noted that lowering the oil absorption properties of SAMS and thus improving its rheology has other practical ramifications. For example, better rheology enables higher SAMS pigment loadings to be used in paper coatings formulations that are to be applied to paper under high shear type conditions.

2. In a more preferred embodiment of the present invention, SAMS pigments with an oil absorption less than 115 ml/100 g would possess a total pore volume of at least 2.0 ml/gm but wherein the pigment pore volume would consist entirely of pore diameters sized between 0.2–0.7 micron or more ideally near 0.3 micron. Based on the optical considerations discussed earlier, microvoids having diameters comparable in size to the wavelength range of visible light should be the most efficient light scatterers. On this basis, the matrix of reactions suited to yielding SAMS pigments of superior optical performance is reduced considerably in scope. Several of the reaction products listed in Table 1-C do not meet the more stringent criteria of our preferred embodiment (see footnote section of Table 1-C). Nonetheless, reaction products satisfying the preferred embodiment criteria can still be produced from sodium silicate reagents ranging in $SiO_2/Na_2O$ mole ratio composition from 1.0 to 3.33. However, the exact Base/Clay reaction ratio requirements vary substantially from one silicate type to another. The silicate plus Base/Clay ratio combinations producing preferred SAMS product compositions can be generally summarized as follows:

| SODIUM SILICATE TYPE | REQUIRED B/C MOLAR RATIO |
|---|---|
| For high mole ratio silicates (N @ 3.33 $SiO_2/Na_2O$) | 0.2 |
| For medium mole ratio silicates (D & RU, from 2.0–2.5 $SiO_2/Na_2O$) | 0.2–0.3 |
| For low mole ratio silicates (meta & BW, from 1.0–1.7 $SiO_2/Na_2O$) | 0.3–0.5 |

For the above SAMS reactions, the associated batch compositions can be generically expressed by the following stoichiometric ranges:

(0.2–0.5 $Na_2O$:$Al_2O_3$:(2.30–2.83) $SiO_2$

Figure 2:
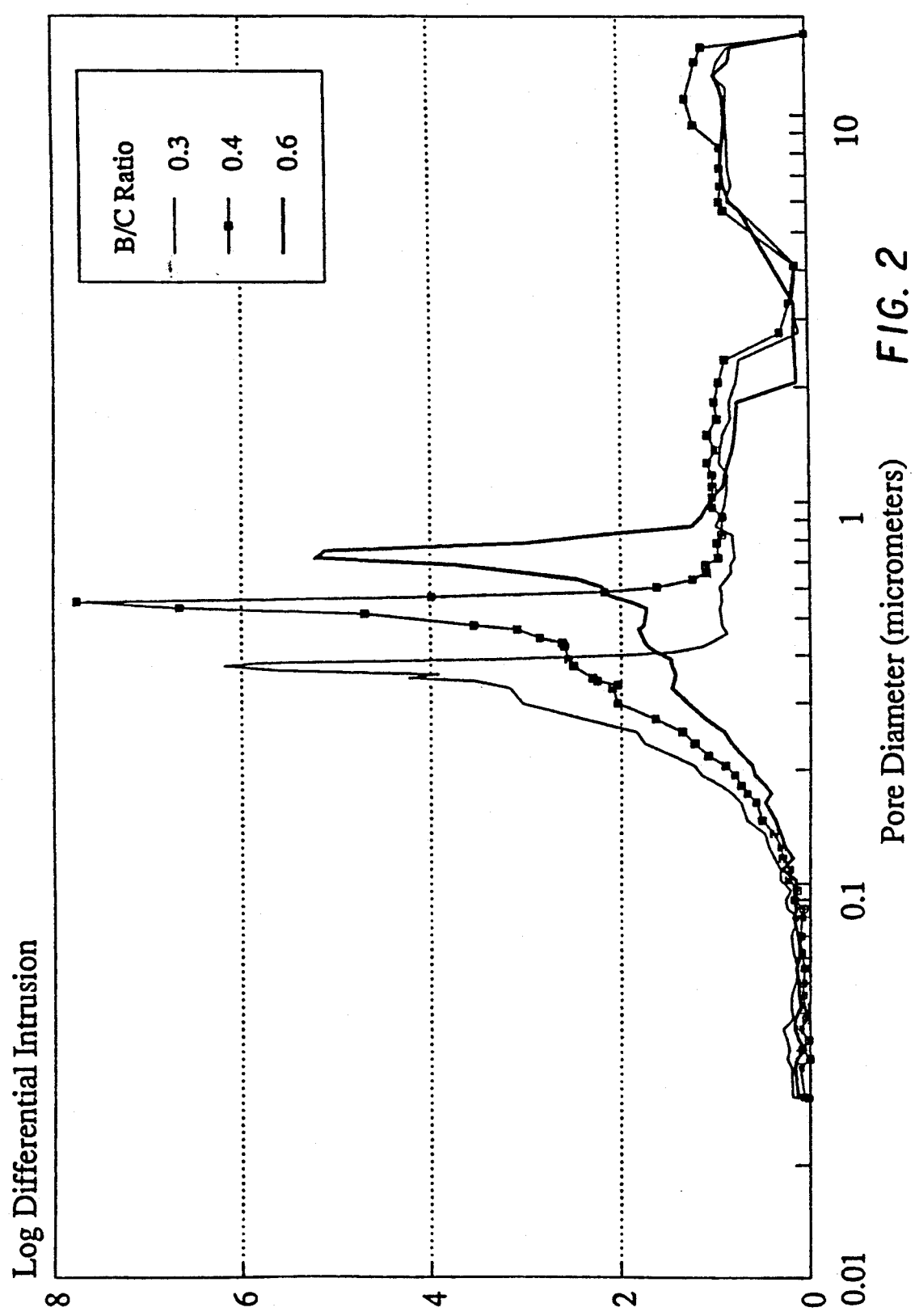

The proposed scheme is intended to be a general guideline on preferred silicate plus B/C ratio combinations rather than an absolute one, since other reaction parameters do have some influence on resulting pore structure properties as well. To better understand the interdependent relationship between silicate mole ratio composition and B/C reaction ratio as pertaining to SAMS pore structure, one has to only examine the pore size distribution curves of FIGS. 1 and 2 respectively. In these figures, the plots of log differential intrusion versus pore diameter are used to illustrate changes in relative pore size distribution. In FIG. 1, the pore size distributions for several SAMS products of 0.3 B/C ratio are compared that were produced from different sodium silicate reagents. These curves show that the pore size distribution broadens significantly towards larger pore diameters as the sodium silicate mole ratio composition increased from 1.0 to 3.33. A similar systematic broadening of pore size distribution towards larger pore diameters can also be observed in FIG. 2 as higher B/C reaction ratios are employed. In FIG. 2, SAMS products consisting of BW-50 silicate and Hydragloss 90 clay at B/C molar ratios of 0.3, 0.4 and 0.6 are compared. In both test scenarios, the reaction solids were maintained at 12%. The pore distribution curves of FIGS. 1 and 2 shown why lower B/C reaction ratios are needed when sodium silicate reagents of higher mole ratio composition are selected for use.

3. In the most preferred embodiment of the present invention, SAMS pigments having an oil absorption less than 115 ml/100 g would possess a total pore volume exceeding 2.5 ml/gm wherein the pores would have nearly uniform pore size diameter of 0.3 micron for providing optimal light scattering properties. None of the SAMS products listed in Table 1-C meet these new criteria; however, such products can be produced once other reaction parameters beyond silicate type and B/C ratio are taken into consideration and fully optimized. The SAMS pigment that will be presented in Example 5 fulfills the above criteria and represents our most "state of the art" product. Once the influence from other reaction parameters are fully taken into account, then some distinct preferences arise among the available silicate reagents used in producing SAMS products. Sodium silicates having a $SiO_2/Na_2O$ mole ratio composition of about 2.06 are most highly preferred for the following reasons:

a. Sodium silicates of higher mole ratio composition (particularly N at 3.33 M.R.) have a greater propensity to yield SAMS products of coarser particle size and also higher oil absorption. These properties result from the higher silica contents provided by such sodium silicate reagents. Both of these trends are in opposition to the desired SAMS pigment properties.

b. Sodium silicates of very low mole ratio composition (like meta at 1.0 M.R.) require somewhat higher Base/Clay reaction ratios to yield a functionally equivalent SAMS product. Using greater amounts of silicate reagent is undesirable from the standpoint of increasing the manufacturing costs.

TABLE I-A

A Study of Sodium Silicate/Hydragloss 90 Clay Reactions Conducted Under Hydrothermal Conditions

| Sodium Silicate Reagent* Reacted with HG-90 Clay | Base/Clay Molar Ratios Examined | Reaction Solids,** % |
|---|---|---|
| N (3.33 $SiO_2/Na_2O$ M.R.) | 0.1–0.5 | 12.0 |
| RU (2.47 $SiO_2/Na_2O$ M.R.) | 0.1–0.5 | 12.0 |
| D (2.06 $SiO_2/Na_2O$ M.R.) | 0.1–0.6 | 12.0 |
| BW-50 (2.06 $SiO_2O/Na_2O$ M.R.) | 0.1–0.6 | 12.0 |

TABLE I-A-continued

A Study of Sodium Silicate/Hydragloss 90 Clay Reactions Conducted Under Hydrothermal Conditions

| Sodium Silicate Reagent* Reacted with HG-90 Clay | Base/Clay Molar Ratios Examined | Reaction Solids,** % |
|---|---|---|
| Meta (1.0 SiO$_2$/Na$_2$O M.R.) | 0.1–0.6 | 12.0 |

Note:
*All sodium silicates shown here are commercially available from PQ Corporation. The Si$_2$/Na$_2$O mole ratio composition of each silicate is shown in parenthesis.
**The hydrothermal conditions utilized in these reactions were as follows:
- 120 psig (172° C.),
- 1 hour cook time.
- 250 rpm mix speed in a 2-gallon laboratory Parr reactor

TABLE 1-B

Comparison of Pigment Structure Definitions: Oil Absorption versus Pore Volume

| Pigment Structure Level | "Old Definition" Based on Oil Absorption, ml/100 g | "New Definition" Based on Total Pore ml/g |
|---|---|---|
| VHS (Very High Structure) | Above 200 | Above 3.3 |
| HS (High Structure) | 175–200 | 2.5–3.3 |
| MS (Medium Structure) | 125–175 | 1.6–2.5 |
| LS (Low Structure) | 75–125 | 0.8–1.6 |
| VLS (Very Low Structure) | Less Than 75 | Less than 0.8 |

Note:
*Oil Absorption values determined by rub-out method of ASTM-D.281. Structure definition taken from Reference 1 and 2.
**Values determined by Mercury Intrusion Porosimetry using a micromeritics AutoPore-II 9220 unit. Pore volumes were determined over an intrusion pressure range of 10.0–6,029 psia. Data were collected using an advancing contact angle of 130 degrees and a pressure equilibration time of 10 seconds per intrusion measurement point.

TABLE 1-C

SAMS Products Illustrative of the Invention

Basic Physical Property Criteria:
i) SAMS having an oil absorption value less than 115 ml/100 g; but also having a total pore volume of at least 2.0 ml/g.
ii) A more preferred embodiment requires that the pigment pore volume consists only of pore diameters sized from 0.2 to 0.7 micron.

| Silicate/HG-90 Reactions | | Brightness, % | Oil Abs., g/100 g | Pore Volume ml/g | Pore Size Distrib.** Maxima, diameter in microns | Sedigraph Particle Size | |
|---|---|---|---|---|---|---|---|
| Sodium Silicate | B/C Ratio | | | | | %-2 m | %-1 m |
| N | 0.2 | 91.8 | 88 | 2.42 | 0.41, 0.34 (sh) | 73.0 | 43.5 |
| N*** | 0.3 | 91.9 | 106 | 2.30 | 1.13, 0.45 (br) | 43.5 | 23.0 |
| RU | 0.2 | 91.4 | 80 | 2.17 | 0.30 | 79.5 | 56.0 |
| RU | 0.3 | 91.9 | 107 | 2.52 | 0.57, 0.36 | 53.5 | 32.5 |
| D | 0.2 | 91.4 | 77 | 2.03 | 0.30 | 81.0 | 65.0 |
| D | 0.3 | 91.7 | 98 | 2.31 | 0.53, 0.35 | 67.5 | 43.0 |
| D*** | 0.4 | 91.8 | 110 | 2.50 | 0.87, 0.45 | 51.5 | 29.5 |
| D*** | 0.5 | 91.7 | 105 | 2.29 | 0.96, 0.50 | 53.0 | 27.5 |
| D*** | 0.6 | 91.8 | 103 | 2.32 | 1.14, 0.50 (br) | 52.0 | 28.0 |
| BW-50 | 0.3 | 91.2 | 92 | 2.24 | 0.41, 0.33 (sh) | 71.0 | 48.0 |
| BW-50 | 0.4 | 91.4 | 110 | 2.56 | 0.61, 0.45 | 69.5 | 41.5 |
| BW-50 | 0.5 | 91.6 | 101 | 2.54 | 0.63, 0.45 | 67.5 | 38.5 |
| BW-50*** | 0.6 | 91.8 | 105 | 2.15 | 0.81, 0.45 (br) | 63.5 | 32.5 |
| Meta | 0.3 | 91.3 | 86 | 2.08 | 0.33, 0.28 (sh) | 79.0 | 66.0 |
| Meta | 0.4 | 91.3 | 105 | 2.25 | 0.42, 0.35 (sh) | 75.0 | 54.0 |
| Meta | 0.5 | 91.8 | 103 | 2.62 | 0.55, 0.40 (br) | 74.0 | 43.0 |

Note:
*Hydrothermal reactions from the study described in Table 1-A.
**Values determined by Mercury intrustion porosimetry. The designations sh and br denote "shoulder" and "broad distribution" respectively. Also, see FIGS. 1 and 2 for select pore size distribution curves.
***SAMS products not consistent with the more preferred embodiment of this invention (per criterion ii above).

TABLE 1-D

TABLE - PQ SODIUM SILICATE SOLUTIONS

| Product Name | Wt. Ratio SiO$_2$/Na$_2$O | % Na$_2$O | % SiO$_2$ | Density at 68° F. (20° C.) | | | pH | Viscosity Centipoises | Characteristics |
|---|---|---|---|---|---|---|---|---|---|
| | | | | °Be' | lb/gal | g/cm$^3$ | | | |
| S35 ® | 3.75 | 6.75 | 25.3 | 35.0 | 11.0 | 1.31 | 11.1 | 220 | Consistency of thin syrup |
| STIXSO ® RR | 3.25 | 9.22 | 30.0 | 42.7 | 11.8 | 1.41 | 11.3 | 830 | Syrupy liquid |
| N ® | 3.22 | 8.90 | 28.7 | 41.0 | 11.6 | 1.38 | 11.3 | 180 | Syrupy liquid |
| E ® | 3.22 | 8.60 | 27.7 | 40.0 | 11.5 | 1.37 | 11.3 | 100 | Specially clarified |
| O ® | 3.22 | 9.15 | 29.5 | 42.2 | 11.8 | 1.41 | 11.3 | 400 | More concentrated than N ® |
| K ® | 2.88 | 11.00 | 31.7 | 47.0 | 12.3 | 1.47 | 11.5 | 960 | Sticky heavy silicate |
| M ® | 2.58 | 12.45 | 32.1 | 49.3 | 12.6 | 1.50 | 11.8 | 780 | Syrupy liquid |
| STAR ® | 2.50 | 10.60 | 26.5 | 42.0 | 11.7 | 1.40 | 11.9 | 60 | Brilliantly clear, stable solution |
| RU ® | 2.40 | 13.85 | 33.2 | 52.0 | 13.0 | 1.55 | 12.0 | 2,100 | Heavy syrup |
| D ® | 2.00 | 14.70 | 29.4 | 50.5 | 12.8 | 1.53 | 12.7 | 400 | Syrupy alkaline liquid |
| C ® | 2.00 | 18.00 | 36.0 | 59.3 | 14.1 | 1.68 | 12.7 | 70,000 | Heavy alkaline liquid |
| STARSO ® | 1.80 | 13.40 | 24.1 | 44.6 | 12.0 | 1.43 | 12.9 | 60 | Specially clarified |
| B-W ® | 1.60 | 19.70 | 31.5 | 58.5 | 14.0 | 1.67 | 13.4 | 7,000 | High alkalinity; fairly fluid |

EXAMPLE 2

This experiment illustrates the significant influence that clay feedstock particle size has on resulting SAMS product properties. In particular, the influence on SAMS pore structure and on SAMS product particle size are addressed here. In this study, low oil absorption SAMS products meeting the physical criteria of this invention were prepared from four different hydrous clay feedstocks respectively. The clay feedstocks varied in average Stokes equivalent particle diameter between 0.2 and 0.7 micron. In summation, the clay feedstocks examined represent an assortment of Number 1 and Number 2 type hydrous clay products currently marketed by J. M. Huber under the trade names Hydragloss 90, Hydgragloss, Hydrafine TM 90 and Hyirasperse TM 90.

For each clay feedstock, an analogous SAMS product was produced using our 2-gallon laboratory Parr reactor. The reactions utilized D-silicate (2.06 mole ratio composition) with the appropriate hydrous clay at a B/C molar ratio of 0.2 and 14% reactor solids. The reactions were subjected to a 120 psig (172° C.) cook over one hour using a Parr mixing speed of 150 rpm. For a total batch weight of 5600 gm, this required 685.2 gm of active spray-dried clay (subsequently made down to 50% solids) to be combined with 224.0 gm of D-silicate reagent (as received) and 4,005.6 gm of dilution water to yield the desired reaction stoichiometry. The reaction products were filtered, washed and spray dried as described previously in Example 1.

In accordance with Table 2, the physical properties of our various SAMS pigments indicate substantial changes in pore structure and final particle size as a function of the initial clay feedstock particle size. As the average particle size of the clay feedstock increased, there was a corresponding increase in the SAMS product particle size. At the same time, the pigment pore volume was observed to decrease and the pore size distribution shifted towards larger pore diameters. These pore structure trends are shown graphically in FIGS. 3 and 4 respectively. It is very interesting to note that the maxima associated with the pore size distribution curves occur at diameter sizes that closely match the average Stokes equivalent particle diameter values determined for the initial clay feedstocks. Based on the optical/light scattering concepts presented in Example 1, it is apparent that clay feedstocks of 0.2-0.6 micron average particle diameter must be utilized to produce SAMS products with preferred properties. However, those feedstocks of 0.2-0.3 micron average particle diameter are most highly preferred to use since SAMS pore diameters of similar dimension are produced. SAMS pigments offering microvoids of uniform 0.3 micron diameter are expected to be the most optically efficient. It should also be noted that the oil absorption values reported in Table 2 show very little variation; hence, defining SAMS pigment structure on the basis of oil absorption appears to hold little predictive value.

TABLE 2

Low Oil Absorption SAMS*
Produced from Various Clay Feedstocks

| SAMS Physical Property | Starting Clay Feedstock** | | | |
|---|---|---|---|---|
| | HG-90 | HG | HF-90 | Hydsp.-90 |
| Brightness, % | 92.0 | 88.0 | 90.8 | 90.6 |
| Specific Gravity | 2.52 | 2.52 | 2.52 | 2.52 |
| Sedigraph Particle Size: | | | | |
| % - 2 microns | 80.5 | 80.0 | 67.5 | 49.5 |
| % - 1 micron | 57.0 | 57.5 | 36.0 | 23.5 |
| % - 0.5 micron | 25.0 | 24.5 | 9.0 | 4.0 |
| Oil Absorption, ml/100 g | 89 | 86 | 87 | 90 |

TABLE 2-continued

Low Oil Absorption SAMS*
Produced from Various Clay Feedstocks

| BET Surface Area, m²/g | 22.1 | 21.8 | 17.9 | 15.3 |
|---|---|---|---|---|
| Pore Volume, ml/g (Mercury Intrusion) | 2.33 | 2.26 | 2.14 | 2.04 |
| Pore Size Distribution (Population Maxima), diameter in micron | 0.30 | 0.30 | 0.60 | 0.79 |

Note:
*These products were produced from clay + D-Silicate reactions all conducted at a 0.2 base/clay molar ratio, 14% reaction solids, 120 psig (172° C.) cook over 1 hour and a 150 rpm Parr mix speed.
**The particle-size and brightness of the starting clay feedstocks were as follows:

| Brightness | Average Stokes Equiv. Particle Dia., Micron | Sedigraph Particle Size, % - 2 m | % Brightness |
|---|---|---|---|
| Hydragloss 90 | 0.2 | 98.0 | 91.0 |
| Hydragloss | 0.3 | 95.0 | 87.5 |
| Hydrafine 90 | 0.6 | 92.0 | 90.5 |
| Hydrasperse 90 | 0.7 | 82.0 | 90.0 |

EXAMPLE 3

In this example, the influence of reaction solids and of reactor mixing intensity on SAMS structure properties are examined respectively. Using the selection guidelines set forth in Example 1, D-silicate (2.06 mole ratio) was utilized in our reactions at a Base/Clay molar ratio of 0.3. In all cases, the D-silicate/clay reactions were conducted in a 2-gallon laboratory Parr reactor using a 120 psig (172° C.) cook over 1 hour. Specific details concerning the other reaction parameters (such as percent reaction solids, hydrous clay feedstock, and/or Parr mixing intensity) are summarized accordingly in Table 3. All reaction batches were based on a total reactor charge of 5600 gm in analogy with Examples 1 and 2. The reaction products were also filtered, washed and spray-dried as previously described.

Figure 5:
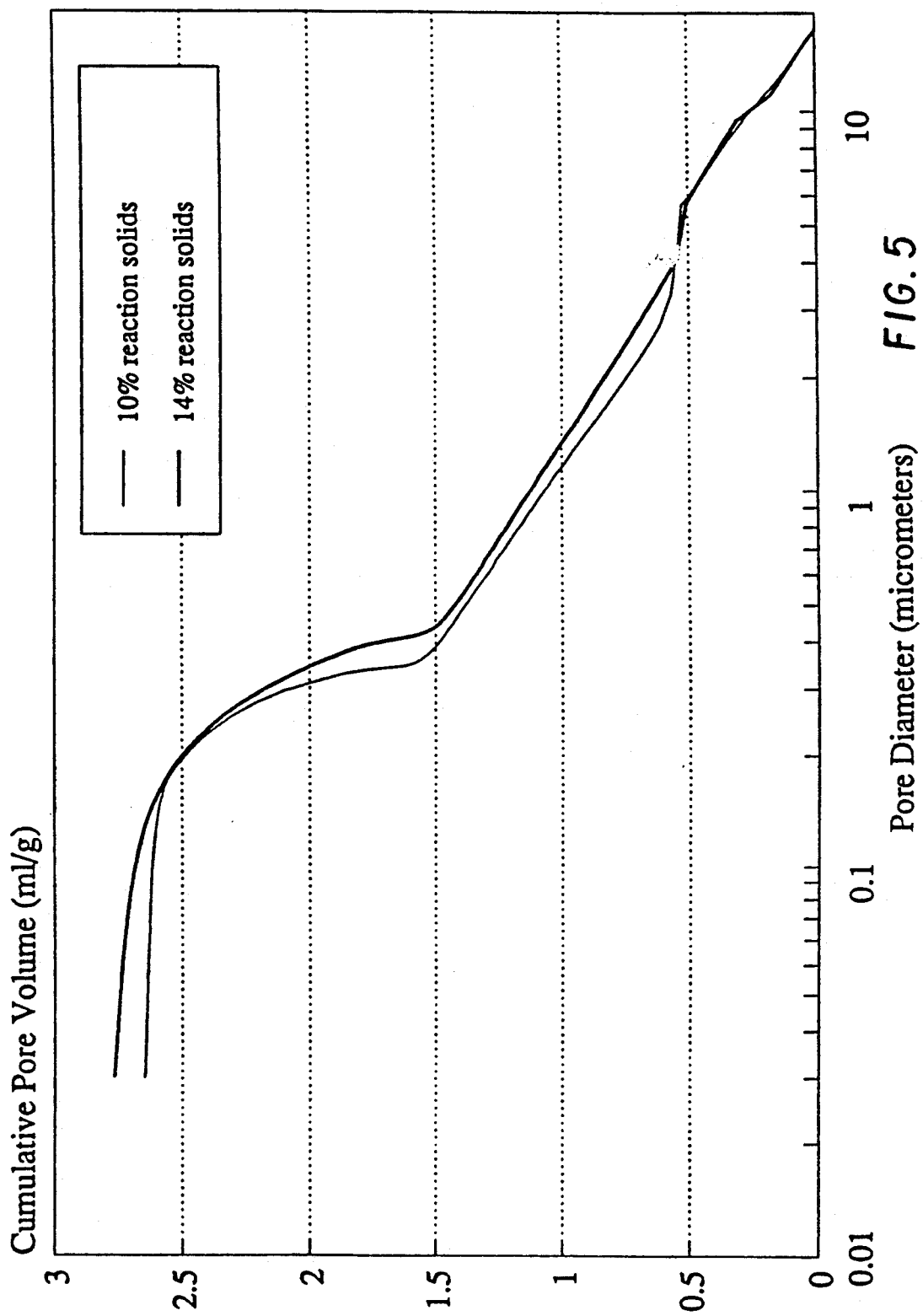
FIGS. 5 and 8 are curves showing cumulative pore volume versus diameter for different reaction solids contents and a prior art comparison, respectively.
Figure 6:
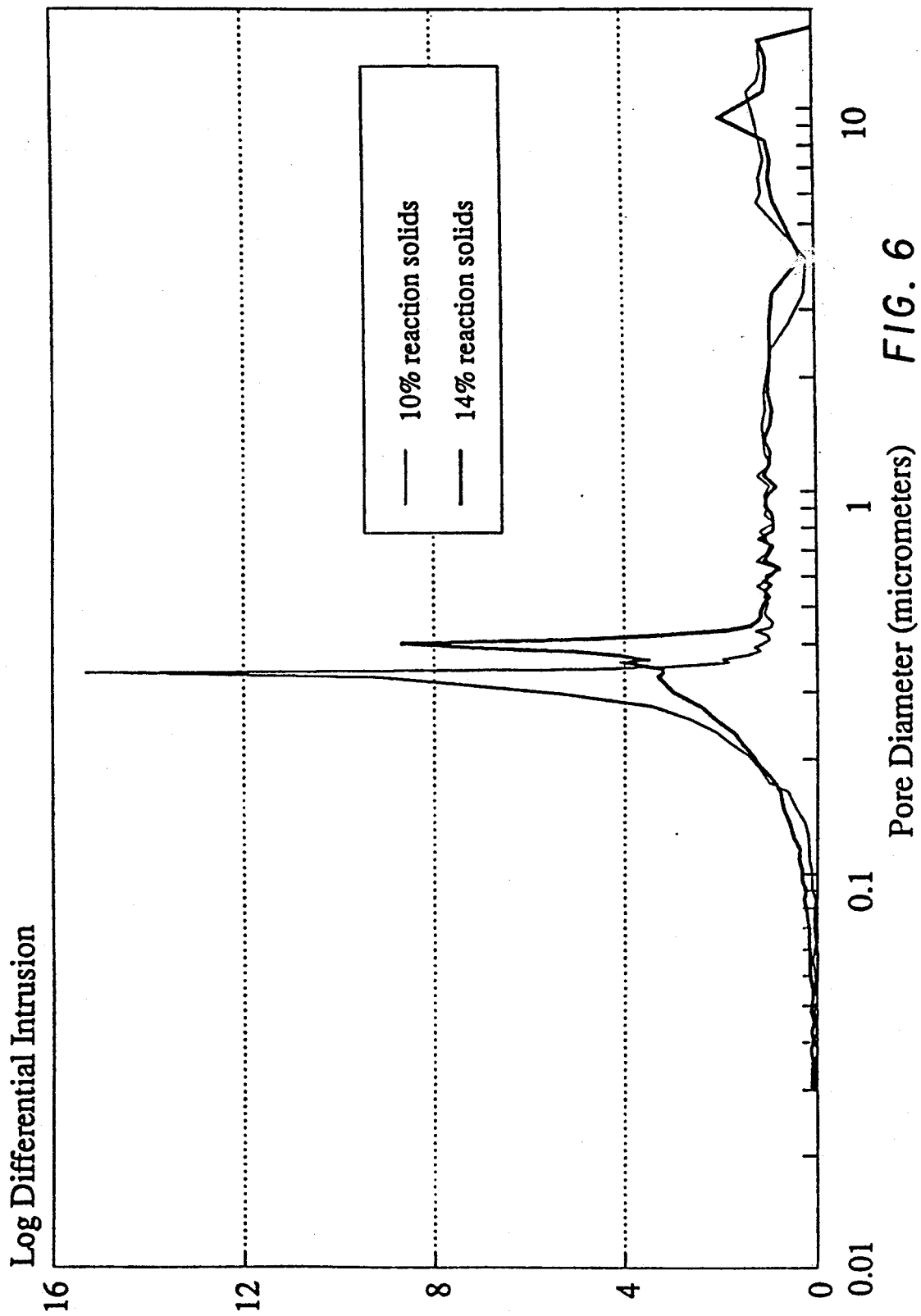

In Part One of this study, Omnifil based SAMS products were produced at different reaction solids ranging from 10-16%. The physical properties of these reaction products indicate substantial changes in pore structure as well as final particle size as the reaction solids were changed (see Table 3). As the reaction solids were systematically increased from 10 to finally 16% solids, there was a corresponding increase in the SAMS product particle size. At the same time, the pore size distribution was observed to broaden somewhat towards pore sizes of greater diameter. Changes in total pore volume with increasing reaction solids were also noted; however, the observed variations did not appear to assume any parallel or regular trend. The pore structure variations resulting from reactor solids changes is shown graphically in FIGS. 5 and 6. As seen in FIG. 6, broadening of the pore size distribution was actually the result of bimodal pore character being formed as higher reaction solids were used. In designing reaction batches to produce SAMS pigments with preferred properties in accordance with this invention, care must obviously be taken in choosing the proper reaction solids. A reactor solids level that maximizes product pore volume is preferred; however, this factor must be weighed against particle size and pore size distribution considerations arising from the reaction conditions. For this reason, reactions of this invention are generally best conducted within the 10-14% solids range since product particle size is generally finer and the pore size distribution remains centered closer to a diameter size of 0.3 micron. The importance of product particle size on functional performance will be addressed in Example 4. It should again be pointed out that oil absorption methods failed to distinguish any structural differences in these SAMS products.

In Part Two of this study, Hydragloss 90 based SAMS products were produced at 14% reaction solids but wherein mixing intensities ranging from 150 to 350 rpm were examined. The physical properties of these SAMS products indicate that structural changes do occur as the mixing intensity was varied. As the Parr mixing speed was increased from 150 to 250, and then finally to 350, rpm, there was a corresponding increase in the SAMS product particle size (see Table 3). At the same time, the pigment pore volume was being substantially decreased while oil absorption capacity was actually increased. Using minimal mixing speeds to increase pigment pore volume and to lower oil absorption capacity, is an important aspect of our SAMS reaction process. Slower mixing speeds were also preferred from the standpoint of yielding SAMS products of finer particle size (around 85% -2 microns is preferred;, see Example 4).

TABLE 3

I. Influence of Reaction Solids

Reaction: Omnifil TM clay + D-Silicate reactions at 0.3 Base/Clay molar ratio, 120 psig (172° C.) cook over 1 hour with Parr mix speed of 150 rpm and the reactor solids ranging from 10–16%. D-Silicate (PQ Corp.) has a 2.06 $SiO_2/Na_2O$ mole ratio.

| SAMS Physical Property | Batch Reaction Solids, % | | | |
|---|---|---|---|---|
| | 10 | 12 | 14 | 16 |
| Brightness, % | 84.2 | 84.2 | 84.0 | 83.8 |
| Specific Gravity | 2.52 | 2.52 | 2.52 | 2.52 |
| Sedigraph Particle Size. | | | | |
| % - 2 microns | 82.5 | 78.0 | 64.0 | 49.5 |
| % - 1 micron | 59.5 | 54.0 | 42.5 | 29.0 |
| % - 0.5 micron | 24.5 | 23.5 | 19.5 | 11.5 |
| Oil Absorption, ml/100 g | 99 | 101 | 103 | 99 |
| BET Surface Area, $m^2/g$ | 22 | 22 | 22 | 23 |
| Pore Volume, ml/g (Mercury Intrusion) | 2.65 | 2.57 | 2.57 | 2.53 |
| Pore Size Distribution (Maxima), diameter in micron | 0.37 | 0.39, 0.33 | 0.44, 0.36 | 0.55, 0.33 |

II. Influence of Reactor Mixing Speed

Reaction: Hydragloss TM clay + D-Silicate reactions at 0.3 Base/Clay molar ratio, 120 psig (172° C.) cook over 1 hour, 14% solids, but with the Parr mixing speed varied from 150, to 250 and then finally 350 rpm, respectively. D-Silicate (PQ Corp.) has a 2.06 $SiO_2/Na_2O$ mole ratio composition.

| SAMS Physical Property | Parr Reactor Mix Speed, rpm | | |
|---|---|---|---|
| | @ 150 | @ 250 | @ 350 |
| Brightness, % | 92.0 | 92.0 | 91.7 |
| Specific Gravity | 2.52 | 2.52 | 2.52 |
| Sedigraph Particle Size. | | | |
| % - 2 microns | 70.0 | 61.5 | 57.5 |
| % - 1 micron | 47.5 | 41.0 | 35.0 |
| % - 0.5 micron | 22.5 | 19.0 | 15.0 |
| Oil Absorption, ml/100/g | 94 | 105 | 106 |
| BET Surface Area, $m^2/g$ | 26 | 26 | 24 |
| Pore Volume, ml/g (Mercury Intrusion) | 2.86 | 2.76 | 2.62 |

EXAMPLE 4

Using the reaction parameter concepts discussed in Examples 1-3 (concerning silicate type and B/C ratio selection, as well as percent solids, mixing intensity and clay feedstock requirements) preferred products of this invention were produced using a 250-gallon Pilot scale reactor. This high pressure reactor was equipped with a 17-inch diameter marine style impeller having variable speed capability and, in contrast to the laboratory Parr reactor, was heated entirely by internal steam sparging rather than by an external heat source. Hydrothermal reactions of Hydragloss 90 clay with D-silicate and with Meta-silicate were conducted, respectively, in accordance with the conditions outlined in Table 4-A. Reactions #1 and #2 with D-silicate were identical except for a change in reactor mixing intensity. Reactions with Meta-silicate at low and high speeds were also conducted; however, the extremely poor filtration characteristics of the resulting low speed material prevented further processing of it to a finished spray-dried product.

As shown in the materials section of Table 4-A, initial batch solids in the pilot reactions had to be adjusted up to allow for some solids dilution resulting form steam condensation. Final reaction solids at operating temperature and pressure were approximately 10%. After completing the cook period, the product slurry was discharged to a drop tank and subsequently diluted with 190 gallons of fresh water. The hot slurry (65° C.) was then filtered using a rotary vacuum string discharge type filter equipped with an accessory wash blanket so as to wash the filter cake material to a conductivity value of 400 mhos or less. The wash blanket was required to lower product conductivity (by removing soluble alkali) and to obtain the maximum product brightness. The SAMS filter cakes were redispersed at approximately 22% solids using low shear mixing and subsequently spray-dried for testing work. They physical properties of each product are also summarized in Table 4-A. The very high pore volume (greater than 2.5 ml/gm) of each product should be noted. In comparison, Samtone 581 (of the prior art) has an oil absorption value of about 150 ml/100 g. As previously observed, a higher mixing intensity produced a SAMS product of coarser particle size (compare products #1 and 2).

In Part Two of this study, the products of Table 4-A were evaluated as fillers in a wet-end paper application and as coating pigments in a LWC/rotogravure type coating application. In the paper filler study, the three SAMS products were evaluated relative to a premium calcined clay control (ansilex 93). Handsheets were prepared containing 4, 8 and 12 parts of filler respectively. Details concerning the furnish as well as the other test parameters are summarized in Table 4-B. Optical properties including corrected opacity, brightness and whiteness were determined on five handsheets formed for each test. The averaged results are also reported in Table 4-B.

In terms of sheet opacity, the filler data of Table 4-B indicate that the two SAMS products of finer particle size (i.e., A and C) offer equivalent, if not generally superior, performance to calcined clay (particularly at the 12% filler level). SAMS pigment A also provided comparable brightness and whiteness values versus the calcined clay. Despite their similarities in pore structure, pigment B provided reduced opacifying properties across the board versus SAMS pigments A or C. This performance drop can be attributed to the much coarser particle size of pigment B. On this basis, the preferred average particle diameter size range for SAMS products of the present invention is 0.5–0.7 micron (by Stokes Law) or approximately 8% -2 microns.

In a coating study, SAMS of reaction #3 (per Table 4-A) was compared to Samtone 581 in a LWC/roto type formulation wherein five parts of structured pigment was used in combination with 95 parts of delaminated clay. A 60/40 delaminated/#2 clay pigment combination served as a typical control formulation. Other details concerning the coating formulations or the "CLC" coating parameters are summarized in Table 4-C. The coating properties of each system are also reported there. Both SAMS containing formulations (F and G) provided superior opacity and brightness versus the control (E). In terms of opacity, sheet gloss and printed gloss properties, the SAMS of the present invention clearly out-performed Samtone 581. In particular, the improvement in opacity over Samtone 581 can be explained on the basis of superior pigment pore structure design that provides more effective scattering of visible light. The formulation containing the new SAMS also showed notable advantages versus the Samtone 581 formulation in both high shear and low sheath coating viscosities, which is a direct consequence of its lower oil absorption properties. Lower coating viscosities for the new SAMS formulation (G) translated to improved runnability on the "CLC" pilot coater.

TABLE 4-A

Pilot Plant Scale-Up of New Low Oil Absorption SAMS Products

| Reaction Parameters | SAMS Reaction Products | | |
|---|---|---|---|
| | #1 | #2 | #3 |
| Clay Feedstock | HG-90 | HG-90 | HG-90 |
| Sodium Silicate* | D | D | Meta |
| Base/Clay Molar Ratio | 0.3 | 0.3 | 0.5 |
| Reaction Solids, % | 10 | 10 | 10 |
| Reaction Pressure, psig | 120 | 120 | 120 |
| | (172° C.) | (172° C.) | (172° C.) |
| Cook Time, Hrs. | 1.0 | 1.0 | 1.0 |
| Mixing Speed, rpm | 41 | 54 | 54 |
| (fpm tip speed) | (182 fpm) | (240 fpm) | (240 fpm) |
| Material Batch Seet | #1 | #2 | #3 |
| Batch Water, lbs. | 986.0 | 986.0 | 933.4 |
| Silicate, lbs. | 71.6 | 71.6 | 31.8 |
| HG-90 Slurry (67% solids,) lbs. | 217.9 | 217.9 | 200.6 |
| Initial Solids, % | 13.9 | 13.9 | 14.3 |
| Steam Condensate, lbs. | 500.2 | 500.2 | 500.2 |
| Batch Total, lbs. | 1,775.7 | 1,775.7 | 1,666.0 |

Note:
*D-Silicate (PQ Corp.) has a 2.06 SiO$_2$/Na$_2$O mole ratio composition; meta (Metso 2048) has a 1.0 mole ratio.

| Product Physical Properties | #1 | #2 | #3 |
|---|---|---|---|
| Brightness, % | 92.6 | 92.4 | 92.0 |
| Specific Gravity | 2.52 | 2.52 | 2.46 |
| Sedigraph Particle Size, | | | |
| % - 2 microns | 87.0 | 78.0 | 86.0 |
| % - 1 micron | 66.5 | 55.0 | 65.0 |
| % - 0.5 micron | 42.5 | 35.5 | 37.0 |
| Average Stokes Equivalent Particle Diameter, micron | 0.60 | 0.82 | 0.66 |
| Oil Absorption, g/100/g pigment | 108 | 112 | 109 |
| Pore Volume, ml/g (Mercury Intrusion) | 2.66 | 2.62 | 2.70 |

TABLE 4-B

Comparative Performance of Several Low Oil Absorption SAMS Pigments in a Paper Filler Application

| Handsheet Parameters* | |
|---|---|
| Pigments: | A  SAMS (Rxn #1 of Table 4-A) |
| | B  SAMS (Rxn #2 of Table 4-A) |
| | C  SAMS (Rxn #3 of Table 4-A) |
| | D  Calcined Clay (Ansilex 93) |
| Filler Levels: | 4%, 8% and 12%, respectively |
| Furnish: | 60% AO-2 (hardwood) and 40% International Pine (softwood) |
| Freeness: | 336 csf |
| Basis Weight: | 40#/ream |
| pH: | To 4.5 with Alum |
| Retention Aid: | 0.025% Betz 1260 |
| Machine Calender: | 2 Nips (weight of steel roll only) |

Note:
*Handsheets were formed using Tappi Method T205 om-88, rev. 1988, titled "Forming Handsheets for Physical Testing of Pulp".

Results

| Filler Pigment | Filler Level, % | Corrected Opacity, % | Brightness, % | Whiteness Index |
|---|---|---|---|---|
| A | 4 | 78.6 | 84.4 | 65.7 |
| B | 4 | 77.1 | 84.3 | 63.4 |
| C | 4 | 79.1 | 84.2 | 65.5 |
| D | 4 | 78.5 | 84.7 | 65.6 |
| A | 8 | 82.4 | 86.9 | 67.0 |
| B | 8 | 82.1 | 85.9 | 67.4 |
| C | 8 | 82.3 | 85.7 | 67.1 |
| D | 8 | 81.8 | 86.1 | 67.9 |
| A | 12 | 85.7 | 86.9 | 69.2 |
| B | 12 | 83.6 | 86.7 | 69.4 |
| C | 12 | 85.4 | 86.5 | 68.5 |
| D | 12 | 84.0 | 86.9 | 69.9 |

TABLE 4-C

Performance of SAMS Pigments In a LWC/Rotogravure Coating Application

| Paper Coating Formulation (in parts): | E | F | G |
|---|---|---|---|
| Delaminated Clay (Hydraprint) | 60 | 95 | 95 |
| No. 2 Kaolin Clay (Hydrasperse) | 40 | — | — |
| SAMTONE 581 (Medium Oil Abs. SAMS Pigment)* | — | 5 | — |
| SAMS (from Table 4-A, Rxn Product #3, Low Oil Abs.) | — | — | 5 |
| Polyacrylate Dispersant | 0.15 | 0.15 | 0.15 |
| SBR Latex (Dow 620) | 3 | 3 | 3 |
| Starch (Penford Gum 295) | 6 | 6 | 6 |
| Calcium Stearate | 0.5 | 0.5 | 0.5 |

Note:
*Pigment previously described in (U.S. Pat. No. 4,863,796; Example Two).

Coating Conditions:
Coating Solids = 60.0%
Coat Weight = 6.0#/ream
Basestock = 32#/ream woodfree paper
Coating Method = "CLC" pilot coater operating at 2500 fpm.
Super Calendered - 2 nips @ 800 pli, 150° F. heat.

| Coating Properties: | Coated Sheets | | |
|---|---|---|---|
| Property | E | F | G |
| Brightness, % | 71.2 | 72.1 | 72.2 |
| Gloss, % | 40.9 | 39.5 | 40.6 |
| Opacity, % | 85.8 | 86.2 | 87.0 |
| IGT, No. 3 ink (cm/sec) | 228 | 208 | 204 |
| Printed Gloss, % | 50.3 | 48.4 | 52.8 |
| Coating Viscosity: | | | |
| Brookfield (20 rpm, No. 4 spindle), cps | 6000 | 6840 | 5700 |
| Hercules (4400 rpm, E-bob), cps | 77.1 | 94.5 | 87.5 |

EXAMPLE 5

In this study, the #1 reaction product of Example 4 was appropriately scaled up to a 7200-gallon high pressure reactor. A full scale production run was commences wherein water, 31,934 lbs., and D-sodium silicate, 2,040 lbs. (as received), were added to the reactor. The D-silicate reagent has a SiO$_2$nNa$_2$O mole ratio composition of 2.06 and is 44.1% active. Next, 8,015 pounds of Hydragloss 90 dispersed filter cake slurry at 51.9% solids was added. The reactor contents were continuously mixed by a mechanical agitator turning at 8 rpm (180.1 fpm tip speed) and heated to a final temperature of 175° C. (130 psig) using live steam. The steam addition was accomplished by employing an internal steam sparger system. Upon reaching our operating temperature and pressure, the reaction solids had reached 10%. After heating the reaction batch at 130 psig for a total of 65 minutes, the resulting product slurry was vented into a drop tank and subsequently filtered, washed with water, redispersed and then spray-dried to a moisture content of approximately 3%. In analogy with the pilot scale work, a string discharge rotary vacuum filter equipped with an accessory was blanket was used to yield wet filter cake material having a conductivity value of 400 mhos or less. From experience we have determined that a conductivity value of 400 mhos insures that sufficient product washing has occurred to achieve the maximum possible product brightness. Given the amounts of D-silicate, Hydragloss 90 clay and water employed in this hydrothermal process, the reaction batch composition can be described as having a Base/Clay molar ratio of 0.3 at 10% solids or alternatively, in terms of the oxide constituents, as

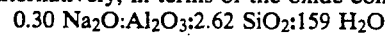
0.30 $Na_2O:Al_2O_3:2.62\ SiO_2:159\ H_2O$ when normalized with respect to the $Al_2O_3$ molar content. Our reaction product was evaluated and characterized by various test methods. The chemical and physical properties of this SAMS product are summarized in Table 5-A. Generically, the product can be described as a sodium aluminosilicate composition. The properties of the Hydragloss 90 clay feedstock as well as those of Samtone 581, per the prior SAMS art, are also listed in Table 5-A for comparative purposes. Based on the elemental analysis data, the specific composition for the preferred SAMS product of this invention can be expressed in terms of its oxide constituents as

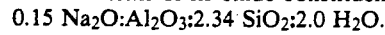
0.15 $Na_2O:Al_2O_3:2.34\ SiO_2:2.0\ H_2O$.

In more general terms, the range of SAMS compositions within the scope of this invention is

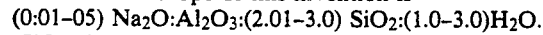
(0.01–05) $Na_2O:Al_2O_3:(2.01–3.0)\ SiO_2:(1.0–3.0)H_2O$.

A $SiO_2Al_2O_3$ mole ratio range of 2.01–3.0 is clearly unique compositionally versus the Samtone 581 product of the prior art. Samtone 581 had an oxide composition of

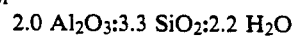
2.0 $Al_2O_3:3.3\ SiO_2:2.2\ H_2O$

Figure 7:
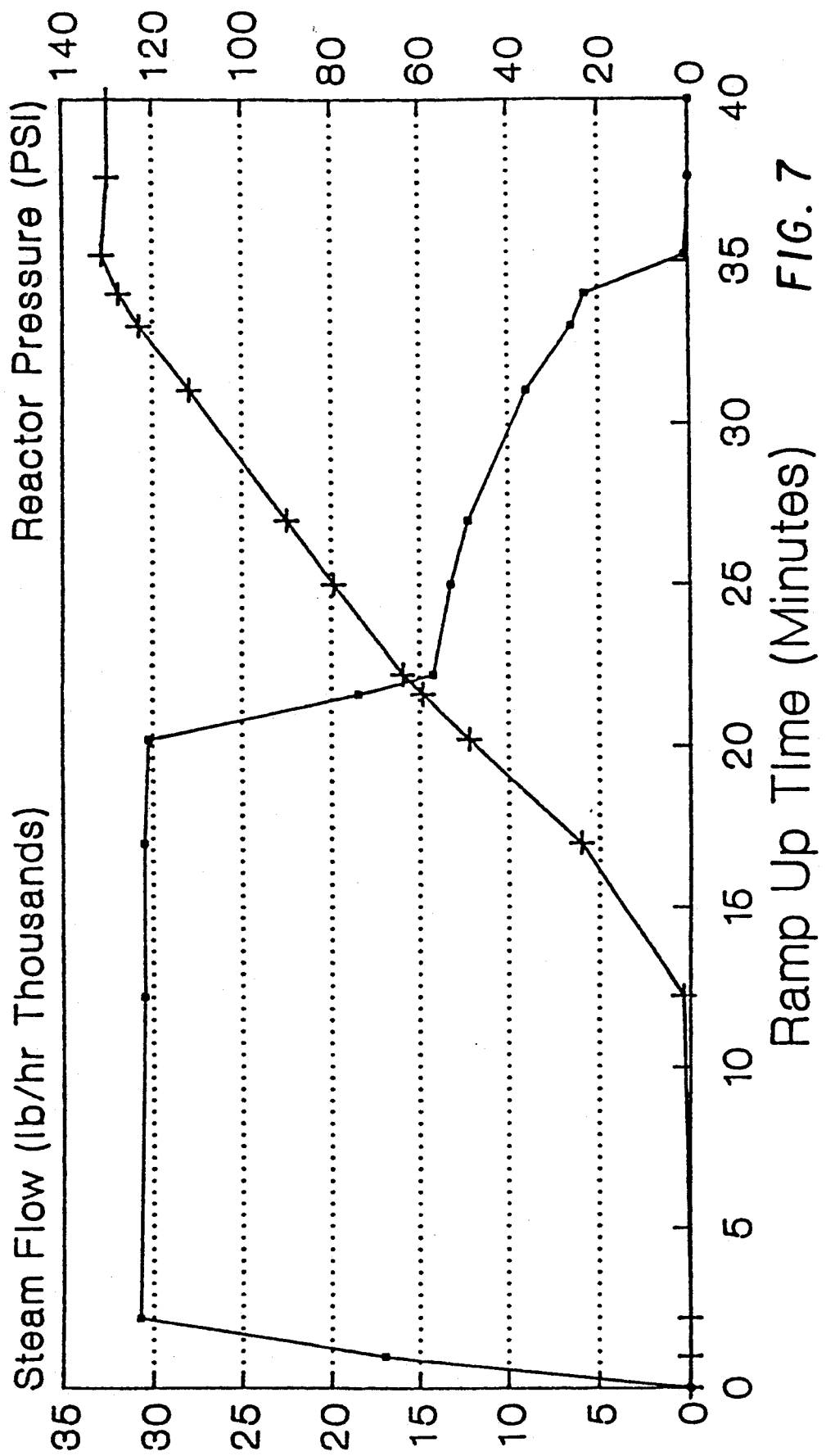
FIG. 7 is a plot of reactor profile comparing steam flow, reactor pressure and time.

A critical feature of the reaction process to produce the SAMS in this example involves the careful regulation of steam flow used in bringing the reactor contents up to 130 psig (175° C.). Table 5-B summarizes the hydrothermal conditions needed to produce the desired SAMS product (target particle size equals 85% -2 microns). In an earlier production run, a coarse particle size SAMS product (70% -2 microns) was produced when a linear pressure-up profile covering 27 minutes was employed. This particle size problem remained despite further adjustments in the reactor's mechanical mixing intensity. In this reaction, downward adjustments in mixing speed below 8 rpm did not provide further decreases in SAMS product particle size. Consequently, a new pressure-up profile of reduced slope was established that extended the reactor's ramp-up time out to 35 minutes (see FIG. 7). This strategy was accomplished by setting a 55 psi intermediate pressure point whereat the steam flow was rapidly reduced by approximately 50% using an automated steam flow control valve system. These changes acted to slow down the reaction associated with aggregate formation and thereby yielded a SAMS product of finer particle size. Laboratory studies have shown that the particle size of SAMS products are largely established during the pressure-up phase and little if any changes occur after approximately 15 minutes into the cook period. It is therefore not surprising that changes in steam flow influence particle size formation. The importance of steam addition rate in controlling particle size was not recognized in the prior art production process.

Figure 8:
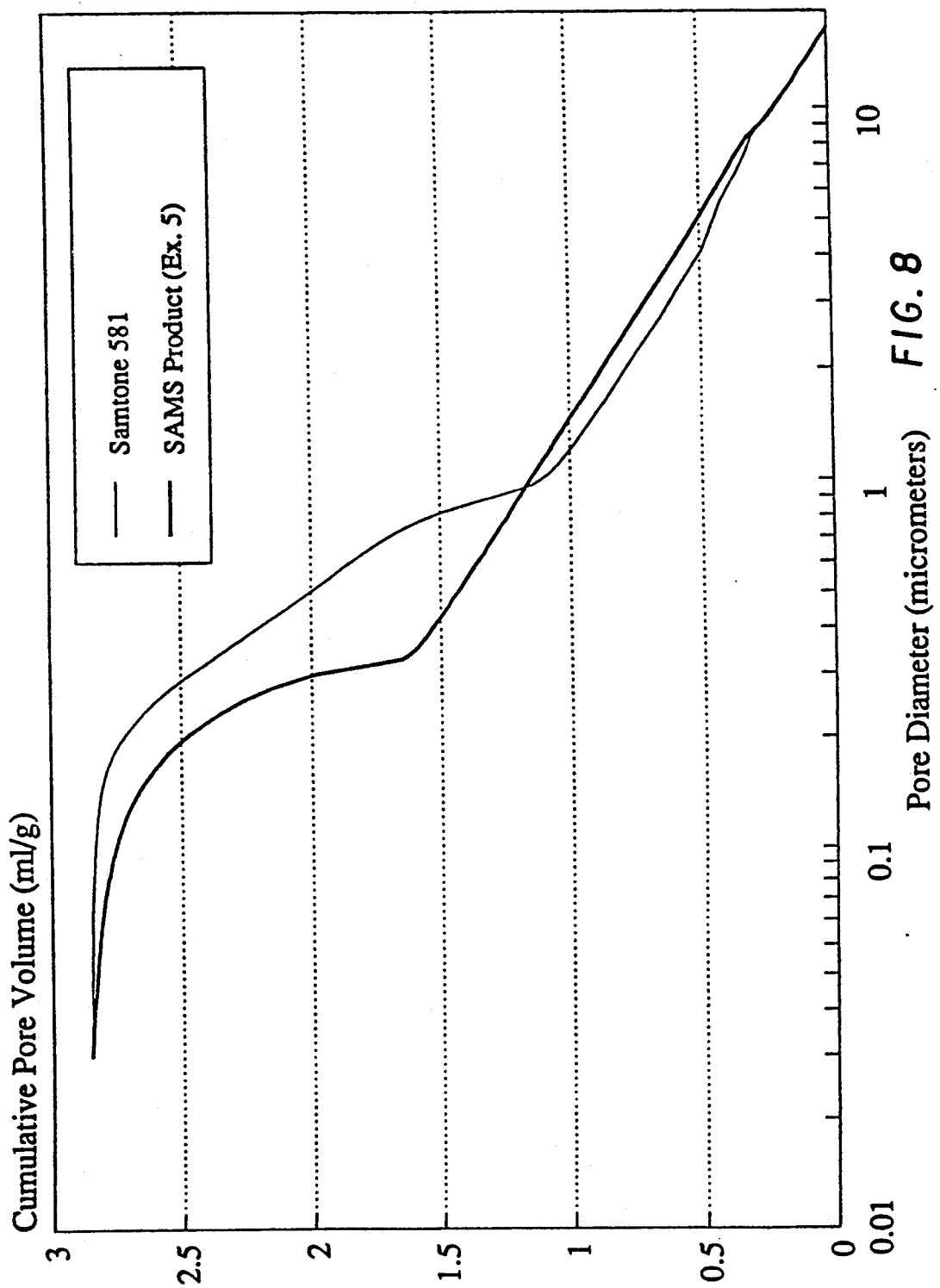

As can be seen in Table 5-A, the preferred SAMS product of this invention exhibits a novel combination of properties relative to the starting Hydragloss 90 clay and to the Samtone 581 product. Of particular significance is the large difference in oil absorption capacity between the new SAMS product and Samtone 581; yet, the total pore volumes of these two products as determined by mercury intrusion are virtually identical (both equalling 2.85 ml/gm). The cumulative pore volume curves for SAMS Example 5 and Samtone 581 are presented in FIG. 8 for comparative purposes. Substantial differences in their intrusion profiles are evident. The differences in pore size distribution can be seen in FIG. 9, which is a derivative type plot of log differential intrusion versus pore diameter (where log differential intrusion equals dV/dlogD). From FIG. 9, it is easy to explain the lower oil absorption capacity of SAMS Example 5 on the basis of its finer pore size distribution versus Samtone 581. Apparently, SAMS Example 5 has many pores that are too small to participate in oil absorption via normal capillary type action. If characterized on the basis of established oil absorption criteria (References 1–3), SAMS Example 5 would have been classified as "low structure" when in fact it actually has a high pore volume content. Structure/oil absorption criteria would have thus incorrectly suggested that SAMS Example 5 would provide lower optical and functional properties than Samtone 581 in various end-use applications. Applications data are presented in the following Examples which clearly demonstrate the superior functional performance of the new SAMS products.

Figure 9:
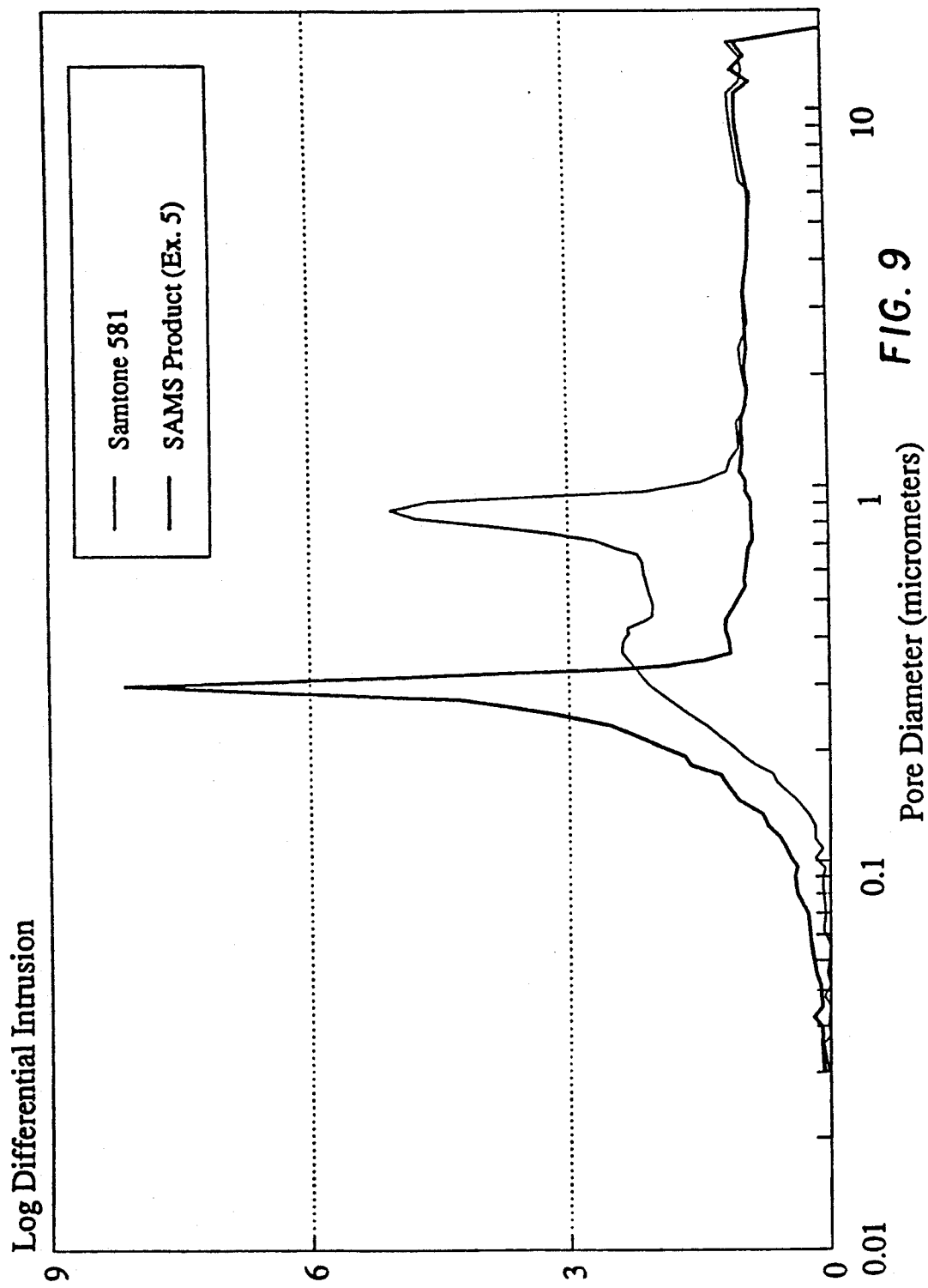
Figure 10A:
FIGS. 10a-d show four photomicrographs of SAMS products of the invention.
Figure 10B:
Figure 10C:
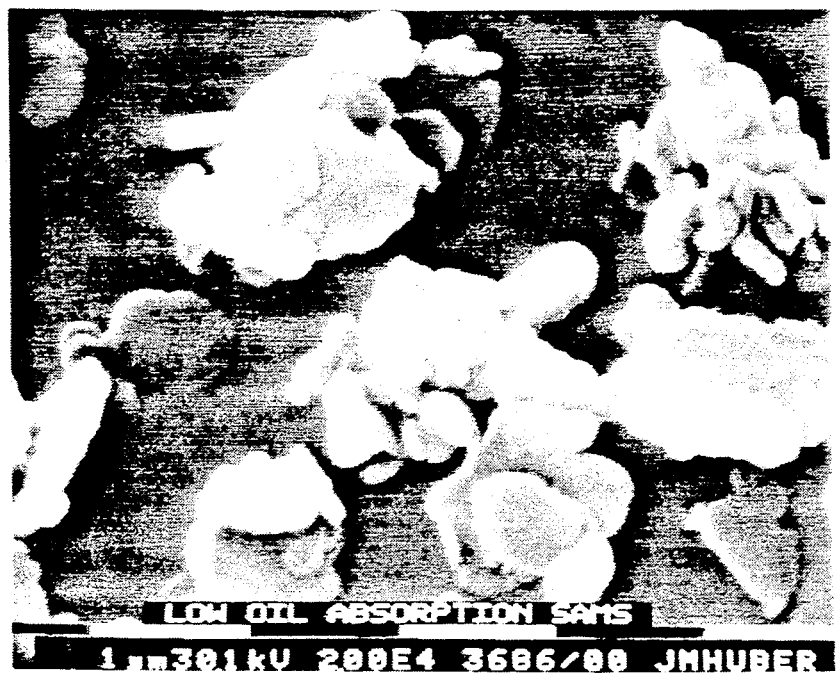
Figure 10D:

As discussed in Example 1, a medium of 1.5 refractive index containing microvoids of uniform 0.3 micron diameter should provide optimum light scattering efficiency for visible light. It is also expected that uniform 0.3 microvoids would be more efficient than a broad type pore distribution of equivalent average size. As can be seen in FIG. 9, Samtone 581 has a rather broad bimodal type pore size distribution with maxima occurring at pore diameters of 0.95 and 0.38 micron respectively. In contrast, SAMS Example 5 was engineered by synthetic means to contain a high pore volume structure having a relatively narrow pore size distribution centered very close to 0.3 micron. It is then not surprising that SAMS Example 5 should exhibit superior optical performance properties to those of the prior art. Total pore volume and pore size distribution, as determined by mercury intrusion, provide a basis for a more universal explanation of SAMS structured pigment performance than oil absorption measurements.

Figure 11:
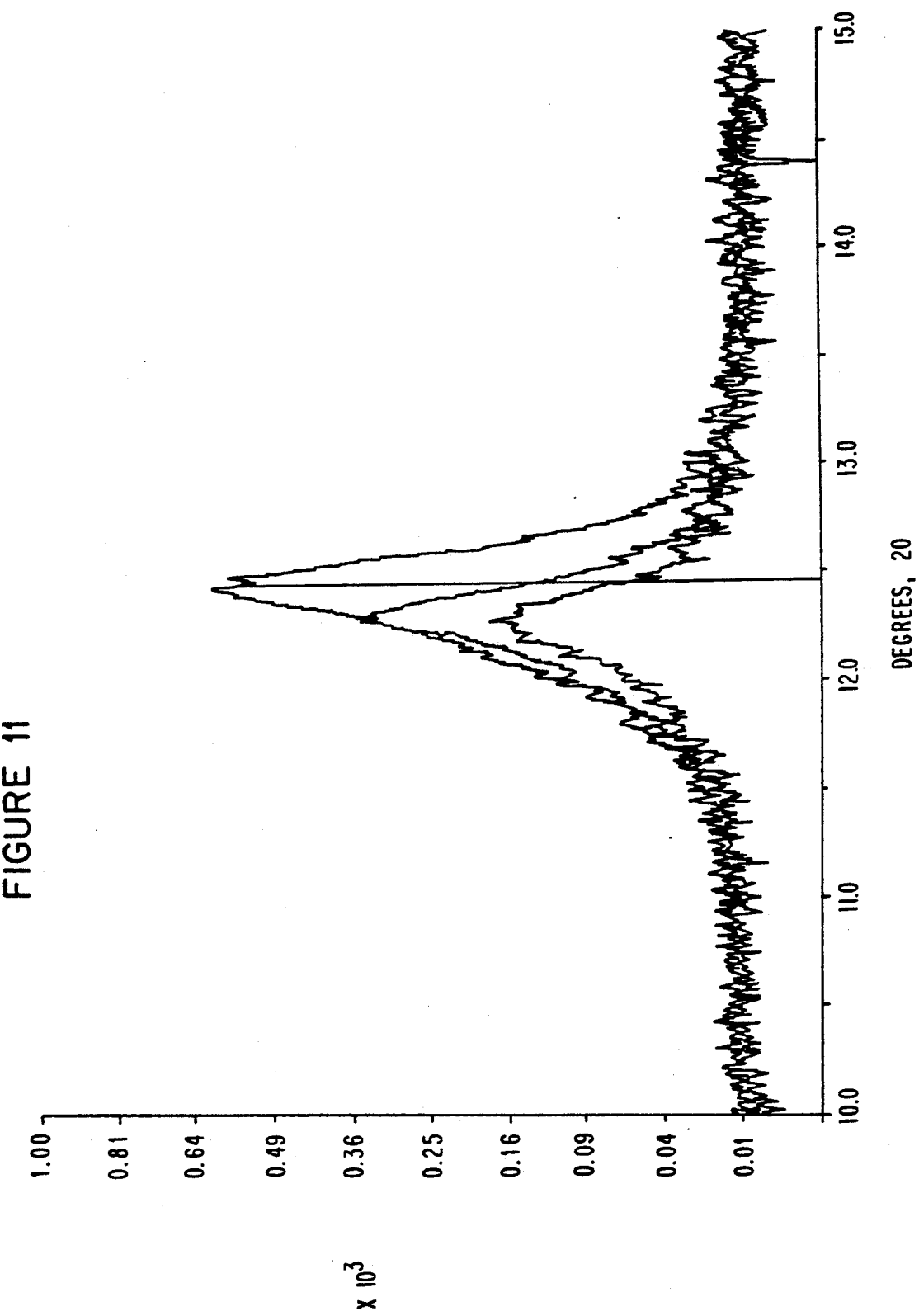
FIG. 11 is a diffraction pattern showing a product of the invention and a prior art product.
Figure 12:
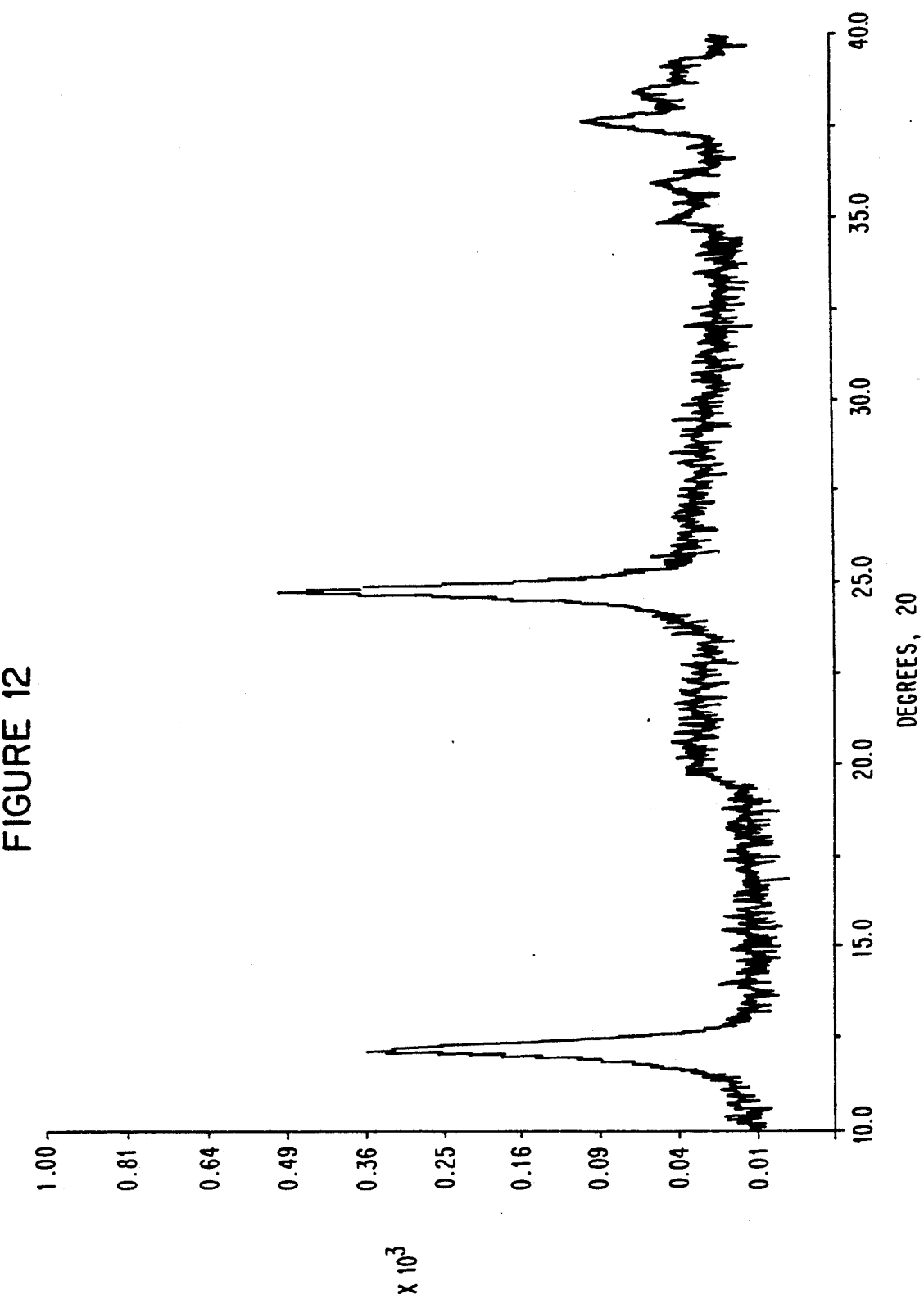
FIG. 12 is an x-ray diffraction pattern of the SAMS product of Example 5.

Like Samtone 581, SAMS Example 5 appears in SEM photographs to be structured agglomerants composed of small flat platelets (see FIG. 10). Likewise, the present SAMS contain remnants of altered clay platelets having an integrated rimmed area of amorphous non-diffracting alkali metal silicate-kaolin reaction product. By the term "rimmed", it is meant that the altered primary particles are comprised of a core material having an integral border or outer edge material of different constitution from the core. The primary particles are generally in the form of lamella (irregular to pseudo-hexagonal shaped plates). The rim is an outer edge or border which usually substantially encompasses the plate perimeter. By the term "amorphous" it is meant that the material does not have a characteristic x-ray diffraction pattern. When comparing the x-ray diffraction patterns of SAMS Example 5 and Samtone 581 to that of the starting Hydragloss 90 clay, attenuated kaolinite peaks arising from the kaolin clay remnants are similarly observed. However, it was quite interesting to note that SAMS of the present invention typically show lower degrees of clay platelet alteration than Sametone 581 (see FIG. 11). In FIG. 11, the 0,0,1 diffraction peaks of kaolinite, SAMS Example 5, and Samtone 581 (from top to bottom respectively) are compared and the relative peak heights indicate a greater percentage of kaolinite content left in the SAMS products of Example 5. In FIG. 12, a typical XRD scan of SAMS Example 5 over the two theta region from 10–40 degrees is presented showing the attenuated kaolinite pattern. The same conclusions regarding the extent of clay alteration can also be drawn by comparing the percent loss on ignition values for the two SAMS products (LOI values decrease with increasing extent of clay alteration).

TABLE 5-A

Comparison of Typical Properties Commercial-Scale SAMS Products vs. Hydragloss 90 Feedstock

| Chemical Analysis, % | Hydragloss 90 Clay | SAMTONE 581*** | Low Oil Abs. SAMS |
|---|---|---|---|
| TiO | 0.94 | 0.51 | 0.50 |
| Fe O | 0.98 | 0.83 | 0.80 |
| SiO | 44.79 | 54.57 | 47.74 |
| Al O | 38.37 | 27.95 | 34.66 |
| Na O | 0.03 | 6.75 | 3.23 |
| $H_2O$ (% LOI)* | 13.86 | 10.71 | 12.23 |
| XRD | Kaolinite | Attenuated Kaolin | Attenuated Kaolin |
| Physical Properties: | | | |
| Pore Volume, ml/g (by Mercury Intrusion)** | 0.60 | 2.85 | 2.85 |
| BET Surface Area, $m^2/g$ | 22.0 | 21.5 | 22.0 |
| pH (at 20% solids) | 6.8 | 11.2 | 10.6 |
| Oil Absorption, ml/100/g pigment | 40 | 150 | 105 |
| Einlehner Abrasion, mg wire loss/100 g | 4.0 | 3.5 | 2.8 |
| Brightness, % | 91.4 | 92.6 | 92.2 |
| Specific Gravity | 2.60 | 2.43 | 2.52 |
| Sedigraph Particle Size, % - 2 microns | 98.0 | 61.0 | 84.0 |

Note:
* LOI = Loss on Ignition (@ 925° C.)
**Total pore volumes were determined over an intrusion pressure range of 10.0–6029 psia. Data were collected using an advancing contact angle of 130 deg. and a pressure equilibration time of 10 sec. per intrusion measurement point. A Micromeritics AutoPore-II 9220 porosimeter was used for all measurements.
***Pigment of Example Two per U.S. Pat No. 4,863,796.

TABLE 5-B

The Effect of Reactor Steam Flow on SAMS Product Formation

| | Commercial Scale Production of Low Oil Absorption SAMS | |
|---|---|---|
| Reaction Parameters | Targeted Product (84% - 2 m particle size) | SAMS w/ 70% - 2 m particle size |
| Initial Steam Flow (into reactor), lbs./hr. | 30,500 | 30,500 |
| Intermediate Pressure Point*, Steam Reduction @ psi | 50% @ 55 psi** | None (linear Pressure - up profile) |
| Ramp-Up Time, min. | 35 | 27 |
| Final Cook Pressure, psig | 130 | 130 |

TABLE 5-B-continued

The Effect of Reactor Steam Flow on SAMS Product Formation

| | Commercial Scale Production of Low Oil Absorption SAMS | |
|---|---|---|
| Reaction Parameters | Targeted Product (84% - 2 m particle size) | SAMS w/ 70% - 2 m particle size |
| Cook Time, min. | 65 | 65 |
| Reactor Mix Speed, rpm (fpm tip speed) | 8 (100.5) | 8 (100.5) |

Figure 3:
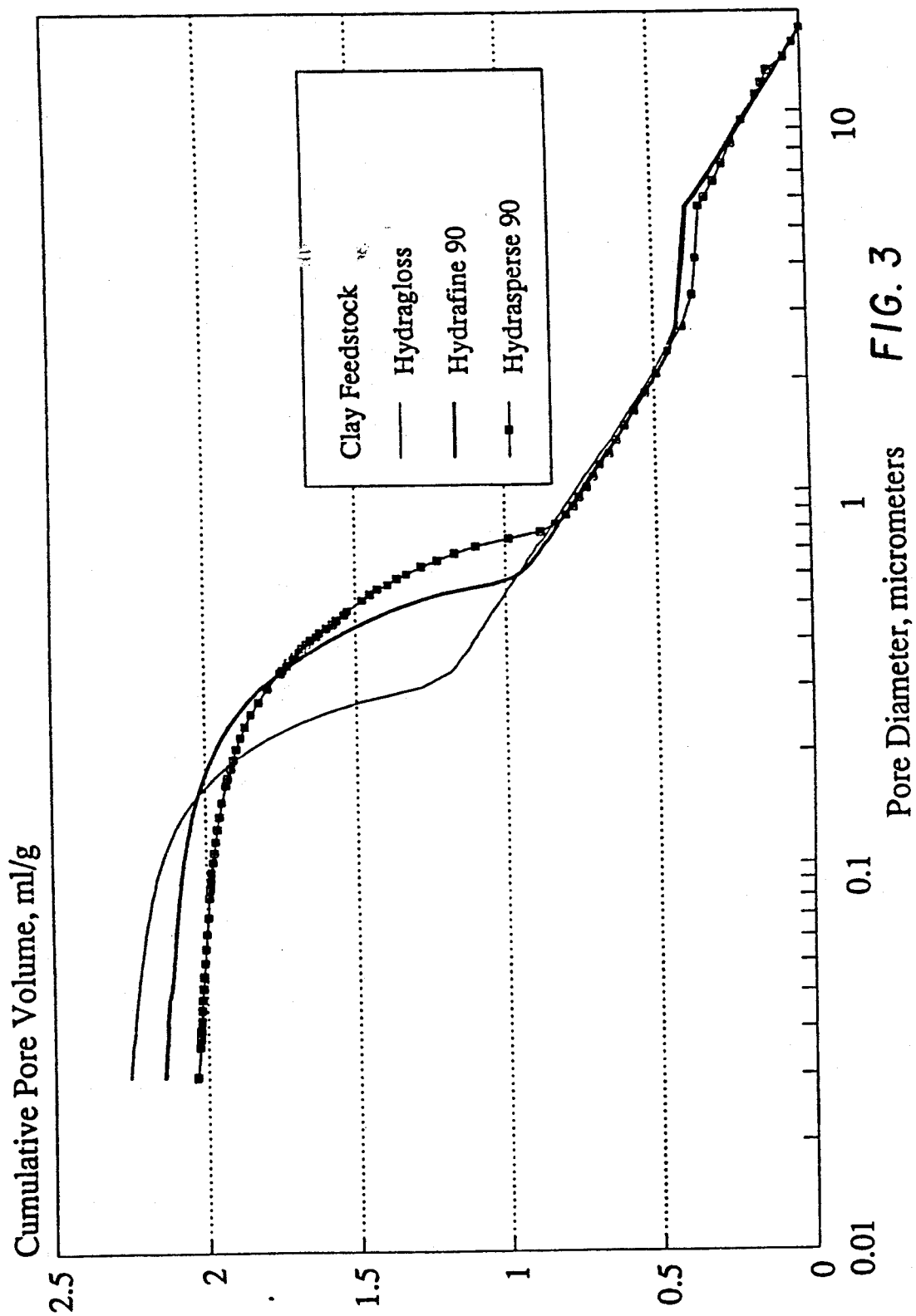
FIGS. 3 and 4 are curves showing the effect of clay particle size and are plots of cumulative pore volume versus pore diameter.
Figure 4:
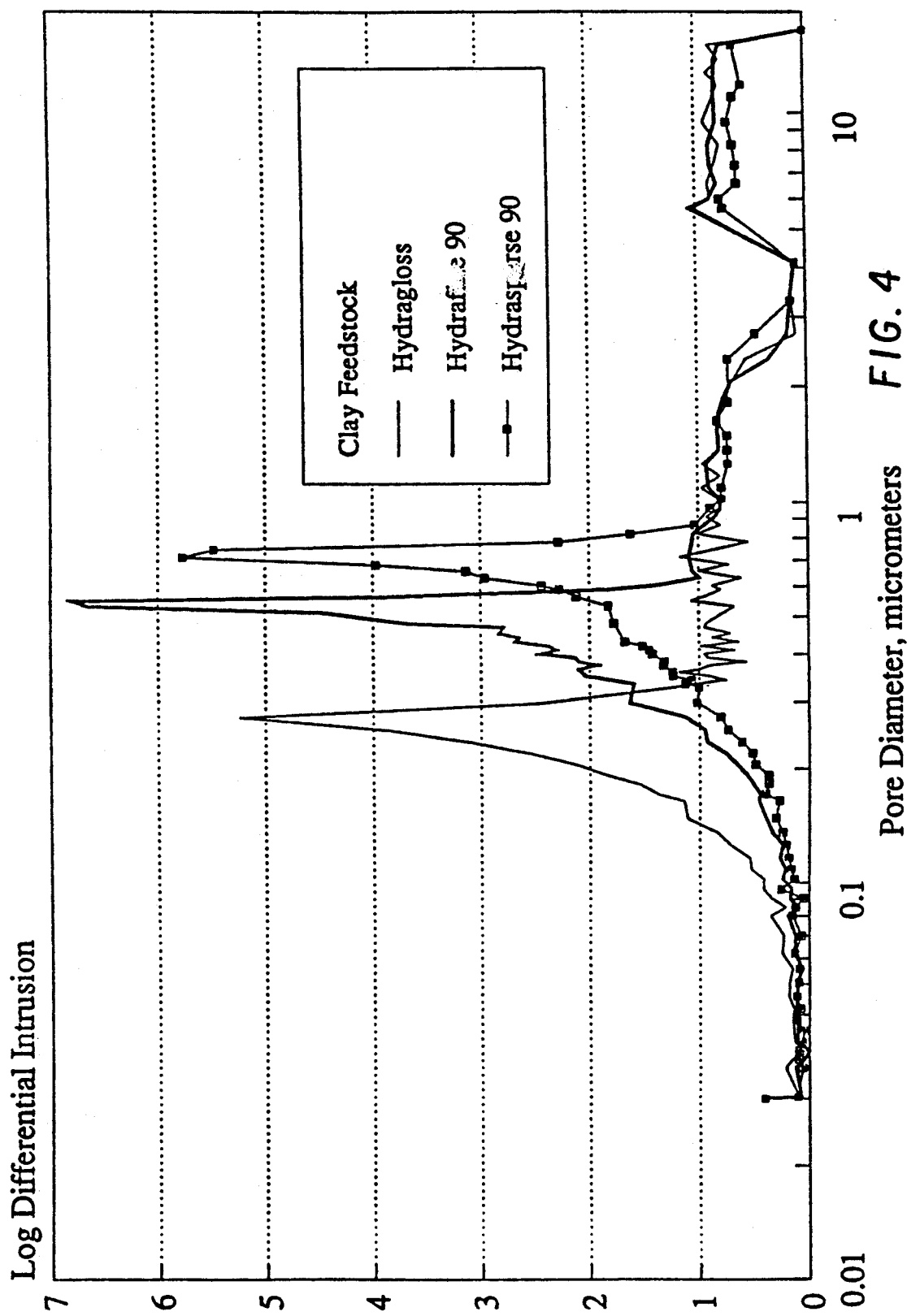

Note:
*Point during the ramp up phase where the steam flow is quickly reduced a set perentage by means of an automated steam control valve.
**See FIG. 3 for the resulting steam flow and reactor pressure profiles.

EXAMPLE 6

In this experiment, the superior slurry makedown and rheological properties of SAMS Example 5 versus Samtone 581 are demonstrated. Also a process is disclosed for preparing a SAMS structured pigment slurry offering high performance properties and having a 50% minimum solids. In a production scale trial, a structured pigment slurry derived from the SAMS of Example 5 was produced using a high shear Cowles, continuous makedown type process. In the makedown, a spray-dried 95/5 composite blend of SAMS/Hydragloss 90 was used for building slurry solids directly in a continuous fashion. The makedown system consisted of a 700-gallon Cowles wet-out tank used in sequence with a second Cowles mix tank of 3,000-gallon capacity. The composite slurry leaving the Cowles tank was then pumped by means of an air diaphragm pump to a large, agitated storage tank capable of holding several tank cars of product.

The wet-out tank in our process was equipped with a 200 horsepower Cowles that was operated at a tip speed of 4300 fpm (3:1 tank to blade diameter ratio and no baffles). The larger mix tank was equipped with a 350 horsepower Cowles that was operated at a tip speed of 5000 fpm (4:1 tank to blade diameter ratio plus baffles). The additional high shear mixing received in this second Cowles tank was very important as it improves product dispersion and lowers Hercules viscosity. Typically, the product throughput rate averaged 4.0 dry tons/hour.

The slurry and spray-dried feedstocks utilized in this makedown process were prepared as follows. In a 150,000-gallon storage tank, 146,900 gallons of SAMS Example 5 (as dispersed filter cake slurry of 22.0% solids) was blended with 2550 gallons of 52.2% solids Hydragloss 90 dispersed filter cake slurry to yield a 95/5 dry weight ratio composite pigment slurry. This filter cake slurry blend represented 163.6 dry tons of composite pigment at 22.6% total solids. The amount of Daxad 30 organic dispersant totaled 0.03% (on active polymer basis). Approximately 75% of our filter cake slurry blend was spray-dried using typical commercial drying conditions. The dry composite pigment was then used in combination with the remaining filter cake slurry blend to yield a final slurry product of 50% solids.

Combining the dry and slurry feedstocks was accomplished by simultaneously feeding them into the Cowles wet-out tank at rates of 98 lb/min. and 16.5 gal/min., respectively. The dry composite pigment was metered in by means of automated dry bin/feeder system. They above feed rates translate to the formation of a 95/5 composite slurry having about 52% solids at a continuous through-put of 4.0 dry tons/hour. The makedown process was continued until 150 dry tons of slurry product had been produced (solids were verified by a specific gravity check to be 52.0%). With all the slurry product now in the large storage tank, solids were reduced to 50.0% with water and the viscosity values determined. At this juncture, the Brookfield (20 rpm) and Hercules (A-Bob) viscosities were 180 centipoise and 18+/655 rpm respectively (see Table 6-A). The viscosity values for a Samtone 581/Hydragloss 90 clay composite slurry of 50% solids produced under similar high shear Cowles makedown conditions are presented in the table as well for comparative purposes. To achieve comparable slurry makedown and rheological properties, 20 parts of Hydragloss 90 clay (rather than just 5) has to be used with the Samtone 581 as a rheological additive. Adding such a high percentage of Hydragloss 90 is not practical as it seriously compromises opacifying properties in many paper related applications for SAMS. The paper coating performance of our structured pigment slurry prepared from SAMS Example 5 will be addressed later in Table 6-C.

Given the relatively low Brookfield viscosity of our 95/5 structured pigment slurry (180 centipoise at 20 rpm), poor slurry stability was inevitable. A stability study indicated the presence of hard sediment after only three days. Therefore, a polymeric thickening agent, preferably an alkali soluble acrylic polymer emulsion like Acrysol TT-615, was employed to improve pigment suspension properties (see Reference 7). Good pigment suspension properties are needed when slurries are to be shipped long distances in bulk by a tank car. To the 150 dry tons of slurry produced from the original makedown process, Acrysol TT-615 polymer was subsequently added. The polymer was incorporated by means of a tank recirculation line equipped with an injection port/in-line mixer combination. In total, 180.0 active pounds of Acrysol TT-615 was added (0.06% by weight) to yield a final slurry product having a Brookfield (20 rpm) viscosity of 660 centipoise and a Hercules viscosity (in dynes) of 18+/640 rpm using the A-Bob. The slurry product thereby exhibited good stability properties over a 4-week time period and can be pumped by customers using ordinary centrifugal type pumps. Achieving a 50% solids structured pigment slurry having good stability and pumpability properties was an important objective of this work. Based on manufacturing experience gained from additional trial runs, the typical range of properties found for the 95/5 structured pigment slurry of this invention are summarized in Table 6-B. Finally, it should also be noted that a critical feature of the slurry process involves initial makedown to 52% solids and then diluting back to 50%; otherwise, Hercules viscosities suitable for centrifugal pumping are generally not achieved.

Another important objective of this work was to produce a SAMS structured pigment slurry (as per above) offering uncompromised performance properties relative to the spray-dried SAMS Example 5 control. An application study was therefore undertaken to compare the performance of three different SAMS products in an offset type coating formulation. Specific details concerning the coating formulations and the "CLC" coating conditions are summarized in Table 6-C. The pigment portion of our coating formulations consisted of a 90/10 blend of #1 fine particle size clay/SAMS pigment wherein Samtone 581, SAMS Example 5 and the 95/5 structured pigment slurry were critically compared. The observed coating properties suggest no deleterious effects on sheet opacity as a consequence of producing a high solids slurry out of SAMS Example 5. In fact, substantial improvements in sheet gloss and printed gloss are actually provided by the slurried SAMS version relative to its original spray-dried control (compare formulation C to B). The performance advantages are even greater when comparing (C) against the formulation containing the Samtone 581 (A).

TABLE 6-A

Comparison of Structured Pigment Slurries Produced from SAMTONE 581 and the Low Oil Absorption SAMS*

| Property | SAMTONE 581/HG-90 Composite** | Low Oil Abs. SAMS*/HG-90 Composite |
|---|---|---|
| Slurry Makedown Conditions | High Shear Cowles | High Shear Cowles |
| MS/HG-90 Wt. Ratio | 80/20 | 95/5 |
| Slurry Solids, % | 50.0 | 50.0 |
| Slurry Viscosities (before Acrysol polymer stabilization): | | |
| Brookfield (20 rpm), cps | 172 | 180 |
| Hercules (A-Bob, 1100 rpm), dynes | 18+/520 rpm | 18+/655 rpm |

Note:
*SAMS product of Example 5 (Table 5-A).
**Rheological data and information on this system taken from Example 1 (Table 1-A) of Reference 7.

TABLE 6-B

Specifications for SAMS Structured Pigment Slurry

| Physical Property | Target Value |
|---|---|
| SAMS*/HG-90 Ratio, by dry wt. | 95/5 |
| Slurry Solids, % | 49–51 |
| Weight per Gallon, lbs. | 11.84–12.05 |
| Acrysol ICS-1 Polymer Dosage, active wt. % (on dry pigment) | 0.04–0.09 |
| Brookfield Viscosity at 50% Solids, (20 rpm, #2 spindle), cps | 600–800 |
| Hercules Viscosity at 50% Solids, (A-Bob, 1100 rpm), dynes | 18.0–18+/400 rpm |
| Particle Size (sedigraph), % - 2 microns | 92–96 |
| Wet Sieve Residue, 325 Mesh (Max.), % | 0.01 |

Note:
*Low oil absorption SAMS product of Example 5 (Table 5-A)

TABLE 6-C

Comparative Performance of SAMS Pigments In an Offset Coating Application

| Paper Coating Formulation (in active parts): | A | B | C |
|---|---|---|---|
| No. 1 Fine Clay (Hydrogloss) | 90 | 90 | 90 |
| SAMTONE 581 (Medium Oil Abs. SAMS Pigment)* | 10 | — | — |
| SAMS (from Example 5, Table 5-A, Low Oil Abs. Pigment) | — | 10 | — |
| SAMS/HG-90 (95/5 SAMS/HG-90 slurry blend)** | — | — | 10 |
| Polyacrylate Dispersant | 0.1 | 0.1 | 0.1 |
| SBR Latex (Dow 620) | 10 | 10 | 10 |
| Starch (Penford Gum 290) | 4 | 4 | 4 |
| Calcium Stearate | 0.5 | 0.5 | 0.5 |

Note:
*Pigment previously described in U.S. Pat. No. 4,863,796; Example Two.
**Composite slurry product of Table 6-B.

Coating Conditions:

Coating Solids = 64.5%
Coat Weight = 7.5#/Ream
Basestock = 45#/Ream woodfree paper
Coating Method = "CLC" pilot coater operating at 2000 fpm
Super Calendered - 2 nips @ 800 pli, 150° F. heat Coating Properties:                    Coated Sheets TABLE 6-C-continued Comparative Performance of SAMS Pigments
In an Offset Coating Application

| Property | A | B | C |
|---|---|---|---|
| Brightness, % | 82.2 | 82.3 | 82.3 |
| Gloss, % | 56.0 | 63.7 | 64.5 |
| Opacity, % | 86.0 | 86.1 | 86.1 |
| Printed Gloss, % | 71.5 | 71.9 | 73.4 |
| Parker Print Surf | | | |
| @ 6 Kgf | 2.19 | 2.29 | 2.22 |
| @ 10 Kgf | 1.61 | 1.64 | 1.57 |
| @ 20 Kgf | 1.25 | 1.26 | 1.19 |

EXAMPLE 7

In this example, evaluation studies were undertaken to illustrate the titanium dioxide extension capabilities of SAMS Example 5 in some typical LWC/offset paper coating applications. Two separate coating formulations were examined, wherein both cases up to five parts of $TiO_2$ pigment were successfully replaced with the SAMS product of Example 5 (see Tables 7-A and 7-B respectively).

In the first coating set, an offset formulation containing a 90/10 #1 fine particle clay/$TiO_2$ pigment blend was modified such that 2.5 parts and then finally 5.0 parts of $TiO_2$ were replaced. The SAMS product of Example 5 was added on a relative dry weight replacement basis of 3.7:1 and 1.:1 respectively. One hundred parts of total pigment were maintained in the formulations. Other details concerning the coating formulations or the "CLC" coating conditions can be found in Table 7-A. As can be seen from the coating performance data of Table 7-A, the SAMS pigment allowed up to 5 parts of $TiO_2$ to be removed form the formulation without any significant decrease in sheet opacity or brightness, and with a concomitant improvement in printed gloss. Sheet smoothness as measured by Parker Print Surf was essentially equivalent to the control coating formulation.

In the second offset coating study, a fine clay-carbonate type formulation was used. A 70/20/10 pigment blend of #1 fine particle size clay, ultrafine ground calcium carbonate and $TiO_2$ pigment, respectively, was modified such that 5.0 parts of $TiO_2$ was replaced with the SAMS of Example 5 at a 1.5:1 dry weight replacement ratio basis. One hundred parts of total pigment were maintained in the formulation by adjusting the fine clay content accordingly. Other details concerning the coating formulations or the "CLC" coating conditions are summarized in Table 7-B. The coating performance data of Table 7-B indicate similar performance trends as observed in the first coating set. Sheet opacity, brightness and smoothness were all maintained, while printed gloss was improved with the replacement of 5 parts $TiO_2$ with 7.5 parts of SAMS Example 5. However, it should be noted that the $TiO_2$ replacement efficiency of our SAMS was better in this offset formulation than in the non-carbonate containing one (1.5:1 versus 1.9:1 of SAMS to $TiO_2$ respectively).

In conclusion, a unique structured pigment system has been presented that increases the amount of microvoids created in a coating formulation, which in turn increased the light scattering capacity of the coating. This enhancement in light scattering effectively allows the removal of some titanium dioxide. Up to 50% removal of $TiO_2$ pigment was achieved with minimal deterioration of optical properties. The SAMS structured pigment did increase viscosity somewhat, although not excessively.

TABLE 7-A $TiO_2$ Extension Capabilities
of Low Oil Absorption SAMS Pigment
in a Fine Clay, Offset Coating Formulation

| Paper Coating Formulation I (in parts): | A | B | C |
|---|---|---|---|
| No. 1 Fine Clay (Hydragloss) | 90.0 | 83.3 | 85.5 |
| Titanium Dioxide | 10.0 | 7.5 | 5.0 |
| SAMS (from Example 5, Table 5-A, Low Oil Abs. Pigment) | — | 9.2 | 9.5 |
| Polyacrylate Dispersant | 0.1 | 0.1 | 0.1 |
| SBR Latex (Dow 620) | 12 | 12 | 12 |
| Oxidized Corn Starch | 4 | 4 | 4 |
| Calcium Stearate | 0.5 | 0.5 | 0.5 |

Coating Conditions:

Coating Solids = 64.0%
Coat Weight = 7.5#/Ream
Basestock = 45#/Ream woodfree paper
Coating Method = "CLC" pilot coater operating at 2500 fpm
Super Calendered - 2 nips @ 800 pli, 150° F. heat

| Coating Properties: | Coated Sheets | | |
|---|---|---|---|
| Property | A | B | C |
| Brightness, % | 83.2 | 83.1 | 83.0 |
| Gloss, % | 70.4 | 70.2 | 70.0 |
| Opacity, % | 94.4 | 94.4 | 94.4 |
| Printed Gloss, % | 75.3 | 75.5 | 77.4 |
| Whiteness Index | 66.1 | 66.2 | 64.7 |
| IGT No. 5 ink (cm/sec) | 182 | 179 | 189 |
| Parker Print Surf | | | |
| @ 5 Kgf | 3.11 | 3.19 | 3.38 |
| @ 10 Kgf | 2.46 | 2.39 | 2.50 |
| @ 20 Kgf | 1.89 | 1.87 | 1.96 |
| Coating Viscosity: | | | |
| Brookfield (20 rpm, No. 4 spindle), cps | 2715 | 2975 | 3100 |
| Hercules (4400 rpm, E-Bob), cps | 59 | 76 | 78 |

TABLE 7-B $TiO^2$ Extension Capabilities
of Low Oil Absorption SAMS Pigment
in a Fine Clay/Carbonate Coating Formulation

| Paper Coating Formulation II (in parts): | D | E |
|---|---|---|
| No. 1 Fine Clay (Hydragloss) | 70 | 67.5 |
| Ultrafine Ground Limestone | 20 | 20 |
| Titanium Dioxide | 10 | 5 |
| SAMS (from Example 5, Table 5-A, Low Oil Abs. Pigment) | — | 7.5 |
| Polyacrylate Dispersant | 0.1 | 0.1 |
| SBR Latex (Dow 620) | 14 | 14 |
| Oxidized Corn Starch | 4 | 4 |
| Calcium Stearate | 0.5 | 0.5 |

Coating Conditions:

Coating Solids = 65.0%
Coat Weight = 7.5#/Ream
Basestock = 45#/Ream woodfree paper
Coating Method = "CLC" pilot coater operating at 2500 fpm
Super Calendered - 2 nips @ 800 pli, 150° F. heat

| Coating Properties: | Coated Sheets | |
|---|---|---|
| Property | D | E |
| Brightness, % | 83.9 | 83.7 |
| Gloss, % | 73.0 | 72.5 |
| Opacity, % | 94.4 | 94.3 |
| Printed Gloss, % | 76.0 | 78.4 |
| Whiteness Index | 66.3 | 65.2 |
| IGT No. 5 ink (cm/sec) | 224 | 206 |
| Parker Print Surf | | |
| @ 5 Kgf | 2.25 | 2.22 |
| @ 10 Kgf | 1.84 | 1.80 |
| @ 20 Kgf | 1.58 | 1.64 |
| Coating Viscosity: | | |
| Brookfield (20 rpm, No. 4 spindle), cps | 1620 | 1680 |
| Hercules (4400 rpm, E-Bob), cps | 50 | 64 |

EXAMPLE 8

In this study, the optical performance of SAMS Example 5 was compared to that of Samtone 581 in a wet end paper filler application. The performance properties were compared at filler loadings of 6% and 12% respectively. Details concerning the furnish and other test conditions are summarized in Table 8. Optical properties including corrected opacity, brightness and whiteness were determined on 5 handsheets formed for each test. The averaged results are also reported in Table 8.

TABLE 8

Comparative Performance of SAMS Pigments in a Paper Filler Application

| Handsheet Parameters* | |
|---|---|
| Pigments: A | SAMTONE 581 (Example Two of U.S. Pat. No. 4,863,796) |
| B | Low Oil Abs. SAMS (Example 5, Table 5-A) |
| Filler Levels: | 6% and 12% |
| Furnish: | 60% AO-2 (hardwood) and 40% International Pine (softwood) |
| Freeness: | 350 csf |
| Basis Weight: | 40#/Ream |
| pH: | To pH 4.5 with Alum |
| Retention Aid: | 0.025% |
| Machine Calender: | 2 Nips (Weight of Steel Roll only) |

Note:
*Handsheets were formed using Tappi Method T205 om-88, rev. 1988.

Results

| Filler Pigment | Filler Level, % | Corrected Opacity, % | Brightness, % | Whiteness Index |
|---|---|---|---|---|
| A | 6 | 81.6 | 84.5 | 66.8 |
| B | 6 | 82.1 | 84.5 | 67.5 |
| A | 12 | 86.2 | 86.2 | 68.9 |
| B | 12 | 85.4 | 86.3 | 69.1 |

EXAMPLE 9

In this program, the optical performance properties of SAMS Example 5 were compared to those of the prior art product, Samhide 583, in an interior latex flat paint formulation. A flashed calcined clay pigment, Optiwhite, was also included in the paint study to provide a conventional control formulation for comparative purposes. A detailed outline of the test formulations is presented in Table 9. As shown there, pigments common to all three formulations included $TiO_2$ (at 150.0 lbs./100 gal.) and coarse ground calcium carbonate (at 123.0 lbs./100 gal.). The pigment volume concentration of these formulations was 58.9%.

The SAMS test pigments in this paint study were used in combination with a high brightness, fine particle size hydrous clay (Huber HG-90). In both cases, a 55/45 dry weight ratio of HG-90/SAMS was employed to yield composite pigment systems. The HG-90/SAMS composites were then compared head to head with Optiwhite calcined clay on an equal volume replacement basis to keep the PVC constant. The paint properties for these formulations are presented in Table 9. Paint B, which contains the SAMS of Example 5, showed some significant performance advantages in hiding power (i.e., contract ratio) and in relative tinting strength versus Paint A containing Samhide 583. When compared to the Optiwhite control formulation, the relative optical advantages seen with SAMS Example 5 are even greater. In terms of sheen and gloss, Paint B yielded somewhat higher values than the other formulations. This property can be attributed to the fine particle size nature of our SAMS Example 5 and Huber HG-90 products. This performance feature can be considered an advantage from the standpoint that it provides greater formulation flexibility. Latex paint formulations ranging from flats to satin finishes can thus utilize SAMS Example 5, whereas Samhide 583 often provides too much flatting efficiency to be used in the latter.

TABLE 9

Comparative Performance of SAMS Pigments In an Interior, Latex Flat Paint Application I. Interior Latex Flat Formulation (lbs. per 100 gallons):

| Ingredients | (SAMHIDE 583) A | (SAMS - EXAMPLE 5) B | (Optiwhite) C |
|---|---|---|---|
| Water | 245.46 | 245.46 | 245.46 |
| Natrosol 250 MBR | 5.00 | 5.00 | 5.00 |
| Colloid 643 | 1.88 | 1.88 | 1.88 |
| Tamol 850-30 | 7.43 | 7.43 | 7.43 |
| Igepal CO-630 | 2.00 | 2.00 | 2.00 |
| AMP-95 | 2.00 | 2.00 | 2.00 |
| Ti-Pure R-901 | 150.00 | 150.00 | 150.00 |
| Huber Carb Q-325 | 123.00 | 123.00 | 123.00 |
| Nuosept-95 | 2.00 | 2.00 | 2.00 |
| Premix Above Thoroughly | | | |
| Huber HG-90 slurry, 70% | 121.47 | 123.72 | — |
| SAMHIDE 583* | 69.97 | — | — |
| Low Oil Abs. SAMS (from Example 5, Table 5-A) | — | 70.86 | — |
| Optiwhite | — | — | 135.40 |
| Water | — | — | 56.04 |
| Disperse at High Speed for 20 Minutes | | | |
| Water | 154.70 | 154.70 | 154.70 |
| Natrosol 250 MBR | 1.00 | 1.00 | 1.00 |
| AMP-95 | 1.00 | 1.00 | 1.00 |
| Ethylene Glycol | 23.13 | 23.13 | 23.13 |
| Texanol | 7.90 | 7.90 | 7.90 |
| UCAR 367, 55% | 220.00 | 220.00 | 220.00 |
| | 1137.94 | 1141.08 | 1137.94 |
| P.V.C., % | 58.9 | 58.9 | 58.9 |

Note:
*Described in Example Two of U.S. Pat. No. 4,863,796

II. Paint Properties:

| | A | B | C |
|---|---|---|---|
| Wet Paint Properties | | | |
| Solids, % | 49.55 | 49.61 | 47.54 |
| Consistency, Krebs Units | 77 | 81 | 71 |
| Fineness of Grind, Hegman | 4 | 3.5 | 3.5 |
| Dry Film Properties | | | |
| Directional Reflectance, Y Value, % | 91.5 | 91.9 | 91.1 |
| Contrast Ratio | 0.980 | 0.988 | 0.979 |
| Tinted Reflectance, Y Value, % | 50.7 | 52.10 | 49.2 |
| Relative Tint Strength, % | — | +10.8 | −8.6 |
| Sheen, White Substrate, 85° | 2.8 | 4.3 | 2.6 |
| Gloss, White Substrate, 60° | 2.8 | 3.0 | 2.7 |

EXAMPLE 10

In this study, a low oil absorption SAMS pigment in accordance with our invention (reaction product #1 of Table 4-A) was examined as a high brightness reinforcing filler in a white rubber formulation. The rubber formulation used in this study is typical of those for a white sidewall tire application. Specific details concerning the components of our screening formulation can be found in Table 10-B.

The SAMS product of this invention was examined as originally produced (per Example 4) and in a pH adjusted form. The latter product was produced by adding sufficient sulfuric acid to the SAMS dispersed filter cake material to obtain a slurry pH of 6.2 and then spray-drying as before. Fillers used as controls in our rubber study included Samflex 585 (per the prior SAMS art) and Nucap TM 100W (a high brightness, fine particle size, Mercaptosilane-modified kaolin clay). All SAMS materials were used without the addition of any Mercaptosile treatment. The comparative physical properties of the various test fillers are summarized in Table 10-A.

In Table 10-B, the physical testing results from our study are summarized. The test data indicate that the new SAMS of pH 6.2 provided reinforcement properties virtually equivalent to that of Nucap 100W. It is truly remarkable that an untreated clay based product would provide modulus and tear properties equal to that of a Mercapto-treated clay. In comparison to Samflex 585 of the prior art, the new SAMS of pH 6.2 offered far superior modulus and tear properties. The pH adjustment of our low oil absorption SAMS (compare formulations B and C) was seen to desirably lengthen the cure time plus improve modulus and tear properties. However, modulus and tear were gained at the expense of some tensile and elongation. Of particular note was the superior optical performance of the new SAMS products (original or pH adjusted) versus the other fillers. It is also truly remarkable that SAMS fillers of lower starting brightness should so clearly out perform Samflex 585 in rubber compound brightness and whiteness values. This performance feature can be explained on the basis of superior capabilities in TiO2 extension.

In summary, the excellent reinforcement and optical performance properties of SAMS products from this invention, make these materials highly desirable fillers for white rubber formulations. In addition, the greater reinforcement properties of our new SAMS are unexpected given the prior art concepts of structure/performance based on oil absorption.

TABLE 10-A

SAMS Produts Used as Fillers in a White Sidewall Rubber Compound

| Test Compounds | Filler Portion |
|---|---|
| A | SAMFLEX 585 (Medium Oil Abs. SAMS; per Example Two of U.S. Pat. No. 4,863,796) |
| B | Low Oil Abs. SAMS (Rxn Product #1, Table 4-A) |
| C | Low Oil Abs. SAMS pH adjusted to 6.2 (per this Example) |
| D | Nucap 100W (Mercapto-treated, high brightness kaolin clay filler) |

| | Filler - Physical Properties | | | | |
|---|---|---|---|---|---|
| | Brightness, % | Particle Size, % - 2 m | Oil Abs., ml/100/g | pH (@ 10% solids) | Specific Gravity |
| SAMFLEX 585 | 92.6 | 60 | 150 | 10.8 | 2.43 |
| Low Oil Abs. SAMS | 91.8 | 87 | 108 | 10.6 | 2.52 |
| Low Oil Abs. SAMS (pH adj.) | 91.8 | 87 | 108 | 6.2 | 2.52 |
| Nucap 100W | 88.0 | 95 | 40 | 6.3 | 2.60 |

TABLE 10-B

Comparative Performance of SAMS Fillers in a White Sidewall Rubber Compound

| Rubber Formulation Material* | Test Compounds*** | | | |
|---|---|---|---|---|
| | A | B | C | D |
| Natural Rubber SMR-L | 60.0 | 60.0 | 60.0 | 60.0 |
| Vistalon 2504 | 20.0 | 20.0 | 20.0 | 20.0 |
| Chlorobutyl HT-1066 | 20.0 | 20.0 | 20.0 | 20.0 |
| SAMFLEX 585 | 47.08 | — | — | — |
| Low Oil Abs. SAMS | — | 45.40 | — | — |
| Low Oil Abs. SAMS (pH adj.) | — | — | 45.40 | — |
| Nucap 100W | — | — | — | 44.00 |
| Titanium Dioxide (anatase) | 35.00 | 35.00 | 35.00 | 35.00 |
| Sunolite 240 | 2.50 | 2.50 | 2.50 | 2.50 |
| Sunolite 666 | 2.50 | 2.50 | 2.50 | 2.50 |
| Stearic Acid | 1.00 | 1.00 | 1.00 | 1.00 |
| Ultramarine Blue | 0.20 | 0.20 | 0.20 | 0.20 |
| Zinc Oxide | 5.00 | 5.00 | 5.00 | 5.00 |
| Sulfur | 0.50 | 0.50 | 0.50 | 0.50 |
| Vultac 7 | 1.25 | 1.25 | 1.25 | 1.25 |
| Altax | 0.75 | 0.75 | 0.75 | 0.75 |
| TOTAL MASS** | 195.78 | 194.10 | 194.10 | 192.70 |

Note:
*Component levels are specified in terms of parts per hundred rubber (phr).
**Filler levels were adjusted in order to maintain a constant specific gravity in the final rubber formulation.
***See Table 10-A for Filler details.

| Physical Testing Results Property | Test Compounds | | | |
|---|---|---|---|---|
| | A | B | C | D |
| Rheometer (T = 90%, min.) | 6:00 | 6:45 | 16:45 | 17:00 |
| Durometer (A), pts. | 54 | 56 | 55 | 54 |
| Tensile, psi | 2020 | 2130 | 2050 | 2090 |
| Elongation, % | 710 | 680 | 600 | 590 |
| Modulus @ 100% E, psi | 180 | 200 | 240 | 220 |
| Modulus @ 200% E, psi | 290 | 340 | 450 | 440 |
| Modulus @ 300% E, psi | 410 | 480 | 670 | 680 |
| Tear Die "C", pli | 162 | 183 | 194 | 201 |
| Specific Gravity ±0.02 | 1.32 | 1.32 | 1.32 | 1.32 |
| Compound Brightness, % | 78.2 | 80.2 | 81.4 | 79.0 |
| Compound Whiteness, W.I. | 77.0 | 81.0 | 80.7 | 75.7 |

What is claimed is:

1. A sodium aluminosilicate pigment produced by the hydrothermal reaction of a sodium silicate and a clay in aqueous medium, said pigment being characterized by a pore volume greater than 2.0 ml/gm, wherein the pore diameters are sized between 0.2 to 0.7 micron centered near a pore diameter of 0.3 micron as depicted in FIGS. 6 and 9;

an oil absorption of less than about 115 ml/100 gm, a particle size within the range of 78-90% - 2 microns an average particle diameter of 0.5-0.7 micron as determined by x-ray sedigraph and wherein the $SiO_2$ to $Al_2O_3$ ratio is limited to between 2.01 to 3.0.

2. A pigment according to claim 1 wherein the ratio of silicate to clay in the reaction ranges from 0.2 to 0.5.

3. A pigment according to claim 1 wherein the pore volume exceeds 2.5 ml/gm.

4. A method for the production of a sodium aluminosilicate pigment which is characterized by a pore volume of greater than 2.0 ml/gm wherein the pore diameters are sized between 0.2 to 0.7 micron, centered near a pore diameter of 0.3 micron as depicted in FIGS. 6 and 9; an oil absorption of less than about 115 ml/100 gm, and a particle size within the range of 78-90% - 2 microns, and an average particle diameter of 0.5 to 0.7 micron as determined by x-ray sedigraph which comprises reacting sodium silicate (B) with a clay (C) at a ratio of B:C of 0.2:1 to 0.5:1, the reaction being carried out in aqueous medium and under hydrothermal conditions wherein the B:C mole ration ranges from 0.2:1 for sodium silicates have a mole ratio of $SiO_2/Na_2O$ of up to 3.3 to a B:C mole ratio of 0.5:1 for sodium silicates having a mole ratio of $SiO_2/Na_2O$ of at least 1, and wherein the $SiO_2$ to $Al_2O_3$ ratio is limited to between 2.01/3.0.

5. A sodium aluminosilicate pigment produced by the hydrothermal reaction of a sodium silicate (B) and a clay (C) in aqueous medium wherein the B:C mole ratio ranges from 0.2:1 for sodium silicates having a mole ratio of $SiO_2/Na_2O$ of up to 3.3 to a B:C mole ratio of 0.5:1 for sodium silicates having a mole ratio of $SiO_2/Na_2O$ of at least 1, said pigment characterized by a pore structure of at least 2.0 ml/gm and wherein the pore diameters are sized between 0.2 to 0.7 micron, centered near a pore diameter of 0.3 microns as depicted in FIGS. 6 and 9, an oil absorption of less than about 115 ml/100 gm, a particle size within the range of 78 to 90% less than 2 microns an average particle diameter of 0.5 to 0.7 micron as determined by x-ray sedigraph and wherein the $SiO_2$ to $Al_2O_3$ ratio is limited to between 2.01 to 3.0.

6. An aqueous slurry of sodium aluminosilicate pigment produced by the hydrothermal reaction of a sodium silicate (B) and a clay (C) in aqueous medium wherein the B:C mole ratio ranges from 0.2:1 for sodium silicates having a mole ratio of $SiO_2/Na_2O$ of up to 3.3 to a B:C mole ratio of 0.5:1 for sodium silicates having a mole ratio of $SiO_2/Na_2O$ of at least 1, said pigment characterized by a pore structure of at least 2.0 ml/gm and wherein the pore diameters are sized between 0.2 to 0.7 micron, centered near a pore diameter of 0.3 micron as depicted in FIGS. 6 and 9;

an oil absorption of less than about 115 ml/100 gm, a particle size within the range of 78 to 90% less than 2 microns, an average particle diameter of 0.5 to 0.7 micron as determined by x-ray sedigraph, wherein the $SiO_2$ to $Al_2O_3$ ratio is limited to between 2.01 and 3.0 the slurry consisting of at least 50 percent of pigment, by weight.

* * * * *